United States Patent
Tanaka et al.

(10) Patent No.: US 7,502,887 B2
(45) Date of Patent: Mar. 10, 2009

(54) N-WAY SET ASSOCIATIVE CACHE MEMORY AND CONTROL METHOD THEREOF

(75) Inventors: Tetsuya Tanaka, Kyoto (JP); Hazuki Okabayashi, Osaka (JP); Ryuta Nakanishi, Kyoto (JP); Tokuzo Kiyohara, Osaka (JP); Takao Yamamoto, Osaka (JP); Keisuke Kaneko, Kyoto (JP)

(73) Assignee: Panasonic Corporation, Osaka (JP)

( * ) Notice: Subject to any disclaimer, the term of this patent is extended or adjusted under 35 U.S.C. 154(b) by 194 days.

(21) Appl. No.: 10/578,314

(22) PCT Filed: Sep. 8, 2004

(86) PCT No.: PCT/JP2004/013391

§ 371 (c)(1),
(2), (4) Date: May 4, 2006

(87) PCT Pub. No.: WO2005/048112

PCT Pub. Date: May 26, 2005

(65) Prior Publication Data

US 2007/0136530 A1    Jun. 14, 2007

(30) Foreign Application Priority Data

Nov. 12, 2003   (JP)   ............... 2003-382570

(51) Int. Cl.
*G06F 13/00* (2006.01)
*G06F 12/00* (2006.01)
(52) U.S. Cl. .................... 711/128; 711/118; 711/135
(58) Field of Classification Search ............ 711/128, 711/118, 135
See application file for complete search history.

(56) References Cited

U.S. PATENT DOCUMENTS

| | | | |
|---|---|---|---|
| 4,315,312 | A | 2/1982 | Schmidt |
| 5,353,425 | A | 10/1994 | Malamy et al. |
| 5,802,568 | A | 9/1998 | Csoppenszky |
| 5,845,309 | A | 12/1998 | Shirotori et al. |
| 6,038,647 | A | 3/2000 | Shimizu |
| 6,205,519 | B1 | 3/2001 | Aglietti et al. |
| 6,282,505 | B1 | 8/2001 | Hanawa et al. |
| 6,295,580 | B1 | 9/2001 | Sturges et al. |

(Continued)

FOREIGN PATENT DOCUMENTS

EP    0568221    11/1993

(Continued)

OTHER PUBLICATIONS

English language Abstract of JP 06-266620.

(Continued)

*Primary Examiner*—Hyung S Sough
*Assistant Examiner*—Mardochee Chery
(74) *Attorney, Agent, or Firm*—Greenblum & Bernstein, P.L.C.

(57) ABSTRACT

The cache memory in the present invention is an N-way set-associative cache memory including a control register which indicates one or more ways among N ways, a control unit which activates the way indicated by said control register, and an updating unit which updates contents of said control register. The control unit restricts at least replacement, for a way other than the active way indicated by the control register.

23 Claims, 20 Drawing Sheets

U.S. PATENT DOCUMENTS

| | | |
|---|---|---|
| 2001/0014931 A1 | 8/2001 | Aglietti et al. |
| 2001/0049770 A1 | 12/2001 | Cai et al. |
| 2002/0046325 A1 | 4/2002 | Cai et al. |
| 2003/0236947 A1 | 12/2003 | Yamazaki |

FOREIGN PATENT DOCUMENTS

| | | |
|---|---|---|
| EP | 0856797 | 8/1998 |
| JP | 4-100158 | 4/1992 |
| JP | 4-137053 | 5/1992 |
| JP | 6-019797 | 1/1994 |
| JP | 06-266620 | 9/1994 |
| JP | 8-263370 | 10/1996 |
| JP | 9-160828 | 6/1997 |
| JP | 10-232834 | 9/1998 |
| JP | 2002-116956 | 4/2002 |
| WO | 97/30395 | 8/1997 |
| WO | 00/34870 | 6/2000 |
| WO | 2002-008911 | 1/2002 |

OTHER PUBLICATIONS

U.S. Appl. No. 10/577,133 to Okabayashi et al., which was filed on Apr. 25, 2006.
English language Abstract of JP 10-232834.
English language Abstract of JP 8-263370.
English language Abstract of JP 6-019797.
English language Abstract of JP 4-137053.
English language Abstract of JP 4-100158.
English language Abstract of JP 2002-116956.
English language Abstract of JP 9-160828.

FIG. 4
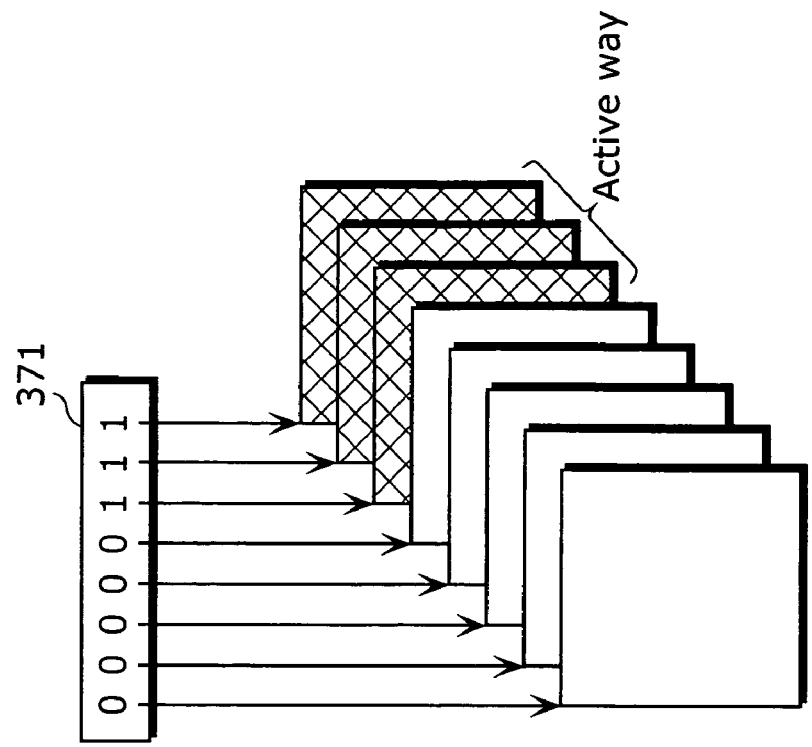
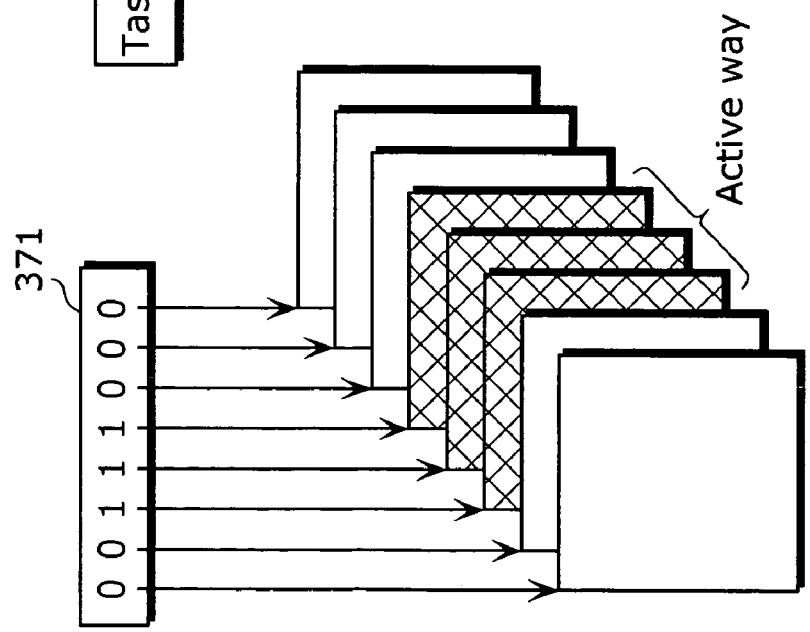

FIG. 20

| Input | | Output |
|---|---|---|
| Wn(n=0~7) | Count value | En |
| 1(Active) | 0(First time) | 1(Enable) |
| 1(Active) | 1(Second time) | 0(Disable) |
| 0(Inactive) | 0(First time) | 0(Disable) |
| 0(Inactive) | 1(Second time) | 1(Enable) |

N-WAY SET ASSOCIATIVE CACHE MEMORY AND CONTROL METHOD THEREOF

TECHNICAL FIELD

The present invention relates to a cache memory and a control method thereof, for facilitating high-speed memory access from a processor.

BACKGROUND ART

A cache memory has conventionally been utilized for shortening main memory access time and improving the processing performance of a processor.

For example, a cache memory disclosed in Japanese Laid-Open Patent Application No. 6-266620 Publication stores main memory data, on a block basis, into respective entries, and performs, via such entries, transfer control and exclusive access control for the data corresponding to the access from a processing unit performing multi-task processing. Such cache memory is equipped, for each entry, with a task identification information registration unit which registers the identification information of each task of a processing unit, which is set as the subject of the exclusive access control for the block stored in the entry, and performs, on a task basis, exclusive access control for the block stored in the entry, as well as the setting and cancelling of such exclusive access control.

With such cache memory, the exclusive access control in multi-task processing is performed efficiently, and the inconsistency of data used commonly among tasks is eliminated.

However, with the aforementioned cache memory of the conventional technology, there is the problem that, with the task switching by the processor, the hit ratio of the cache memory is influenced by other tasks which are not currently being executed.

For example, in the case of switching from the execution of a task A to the execution of a task B in a situation where an instruction sequence (or data) of the task A is stored in the cache memory, the instruction sequence (or data) of the task A inside the cache memory is, evicted due to the execution of the task B. Should the instruction sequence (or data) of the task A be evicted from the cache memory, there is the problem that a cache miss occurs when the task A is executed again. Particularly, in processes requiring real-timeliness, such as the decoding/encoding of compressed audio data and compressed video data, there is the problem that due to the influence of other tasks following such task switching, the time allocated for a task is reduced by the replacement process in the cache after the task switching, and thus the necessary processing time cannot be secured, and real-timeliness is lost or alternatively, processing time cannot be guaranteed.

DISCLOSURE OF INVENTION

The present invention has as an object to provide a cache memory which inhibits the influence of other tasks on the cache memory, brought about by task switching, and which easily secures real processing time for a task.

In order to achieve this object, the cache memory of present invention is an N-way set-associative cache memory including: a control register which indicates one or more ways among N ways; a control unit which activates the way indicated by said control register; and an updating unit which updates contents of said control register.

According to this structure, since only the way(s) indicated by the control register is activated among the N ways making up the cache memory, and the contents of the control register can be updated, it is possible to dynamically set the active way(s) depending on the process being executed by the processor. By placing a correspondence between a task and a way, it is possible to prevent necessary data from being evicted from the cache memory by another task after task switching, and inhibit the influence of other tasks on the hit ratio following task switching. As a result, the real processing time required by a task can easily be secured.

Here, it is possible to have a structure in which said control unit restricts at least replacement, for a way other than the active way indicated by said control register.

According to this structure, at least replacement is restricted for an inactive way(s). In other words, total disabling or the disabling of only replacement may be carried out for the inactive way(s). In the case of the latter, since reading/writing is not restricted with respect to the cache memory, deterioration of the hit ratio can be prevented, and the inactive way(s) can be utilized effectively.

Here, it is possible to have a structure in which the cache memory, further includes: a tag holding unit, provided for each of the ways, which holds, as a tag, a cache data address; and N-comparison units which judge whether a hit or a mishit has occurred, by comparing a tag address and N-tags outputted by said tag holding unit, the tag address being an upper portion of a memory access address outputted from a processor, wherein said control unit disables a comparison unit corresponding to a way other than the active way indicated by said control register.

According to this structure, since the comparison unit(s) corresponding to an inactive way(s) is disabled, the power consumption of the comparison unit(s) can be reduced.

Here, it is possible to have a structure in which said control unit disables tag outputting to a comparison unit, for a cache address holding unit corresponding to the way other than the active way indicated by said control register.

According to this structure, since the tag outputting and the comparison unit corresponding to an inactive way(s) are disabled, the power consumption of the tag holding unit(s) can be reduced.

Here, it is possible to have a structure in which, when a memory access address is outputted from the processor, said control unit: controls said comparison units to perform, for a maximum of two times, tag comparison for the memory access address; disables, in a first tag comparison, a comparison unit corresponding to the way other than the active way indicated by said control register; and causes said comparison units to perform a second comparison, without disabling the comparison unit corresponding to the way other than the active way, in the case where it is judged that a mishit has occurred in the first tag comparison.

According to this structure, the higher the hit ratio for the first tag comparison, the more the power consumption of the comparison unit can be reduced. In addition, as a second tag comparison is carried out when a mishit occurs in the first tag comparison, an inactive way(s) can also be effectively utilized.

Here, it is possible to have a structure in which said control unit disables, in the second tag comparison, the comparison unit corresponding to the way other than the active way.

According to this structure, as only the comparison unit corresponding to an inactive way(s) carries out the tag comparison in the second tag comparison, power consumption can be further reduced.

Here, it is possible to have a structure in which said control unit prohibits status updating for the way other than the active way indicated by said control register.

According to this structure, for example, by prohibiting the updating of flags and the like indicating the status of an inactive way, it is possible to inhibit influences, on an inactive way, brought about by task switching.

Here, it is possible to have a structure in which said control unit prohibits updating of information indicating an access order of the way other than the active way indicated by said control register.

According to this structure, as the updating of information indicating the access order is prohibited, there is no changing of the replacement order of inactive ways due to the updating by the updating unit when a cache miss occurs for a task assigned to an active way.

Here, it is possible to have a structure in which the cache memory further includes a reset unit which resets the information indicating an access order for the ways, when the contents of said control register are updated by said updating unit. Furthermore, it is possible to have a structure in which the information indicating the access order is 1-bit data for each cache entry, said cache memory further includes a register which holds data indicating a round position for selecting, in a round robin, one way from a plurality of replaceable ways, and said reset unit resets said register when the contents of said control register are updated by said updating unit.

According to this structure, the influence on the replacement order of inactive ways, during a cache miss for an allocated task, can be eliminated.

Here, it is possible to have a structure in which said updating unit has: a holding unit which holds way data for respective tasks, which specifies a way to be activated; and a rewriting unit which rewrites said control register so as to hold way data corresponding to a task being executed.

According to this structure, as the control register is rewritten dynamically with every task switching, an active way(s) can be placed in a correspondence on a per task basis.

Here, it is possible to have a structure in which said holding unit holds the way data as part of context data for the respective tasks which is stored in a memory, and during task switching, said rewriting unit saves, in the memory, way data of a current task, inside said register, and restore, from the memory to said control register, way data of a next task.

According to this structure, the updating of the control register can be easily realized, without significantly adding cache memory hardware, through the task switching by the OS (Operating System).

Here, it is possible to have a structure in which said holding unit holds the way data for the respective tasks, and said rewriting unit has: an address storage unit which stores an address range of the respective tasks, stored in the memory; an identification unit which identifies the task being executed, based on the address range stored in the address storage unit and an instruction fetch address outputted from a processor; and a selection unit which selects, from said holding unit, way data corresponding to the identified task being executed.

According to this structure, as the updating of the control register is performed through a decision made on the initiative of the cache memory itself, it is possible to activate the corresponding way(s), for each task, regardless of the type of processor.

Here, it is possible to have a structure in which said holding unit holds the way data for the respective tasks, said rewriting unit includes: a selection unit which selects way data from said holding, according to a task number outputted from a processor unit, the way data corresponding to a task being executed; and a writing unit which writes the selected way data into said control register.

According to this structure, as the task number outputted from the processor is used, it is possible to update the control register simply, and activate a corresponding way(s), for each task, without significantly adding hardware.

Here, it is possible to have a structure in which way data held in said holding unit is assigned to a task, by an operating system.

According to this structure, as the assignment of a way(s) to a task is performed by the OS, the assignment of ways to the respective tasks can be easily optimized.

Here, it is possible to have a structure in which a unit of replacement for respective ways can be switched between a line size of a cache entry and a size which is one over two to the nth power of the line size, said control register further indicates a replacement size for respective tasks, and said control unit performs replacement control with the replacement size indicated by said control unit.

Furthermore, it is possible to have a structure in which said control unit restricts at least replacement for a way other than the active way indicated by said control register, and performs replacement on the active way indicated by said register, with the size indicated by said control register.

Here, it is possible to have a structure in which said updating unit includes: a holding unit which holds way data for respective tasks, specifying a way to be activated, and the replacement size for the respective tasks; and a rewriting unit which rewrites said control register so as to hold way data and a replacement size corresponding to a task being executed.

According to this structure, as the unit of replacement can also be switched at the same time as with the switching of the active way(s) for the respective tasks, it is possible to reduce mishits, depending on the process details of the task.

Furthermore, the cache memory control method in the present invention is a control method for controlling an N-way set-associative cache memory, including: a step of setting, to a control register, way data indicating one or more ways among N ways; and a control step of activating the way indicated by the control register.

Here, it is possible to have a structure in which, in said controlling, at least replacement is restricted for a way other than the active way indicated by the control register.

Here, it is possible to have a structure in which the control method further includes an updating step of reading-out, from a holding unit, way data corresponding to a task being executed, and writing the read-out way data into the control register, the holding unit holding way data for respective tasks, the way data specifying a way to be activated.

As described thus far, according to the cache memory in the present invention, as it is possible to dynamically set the active way(s) for each task executed by the processor, by placing a correspondence between a task and a way, it is possible to resolve the eviction of needed data from the cache memory after task switching, due to other tasks, and inhibit the influence of other tasks, on the hit ratio, following task switching. As a result, the real processing time required by a task can easily be secured.

BRIEF DESCRIPTION OF DRAWINGS

FIG. 4 is an explanatory diagram showing the correspondence relationship between the way register and a way.

FIG. 20 is a truth table showing the control logic of the enable circuit.

BEST MODE FOR CARRYING OUT THE INVENTION

First Embodiment

Figure 1:
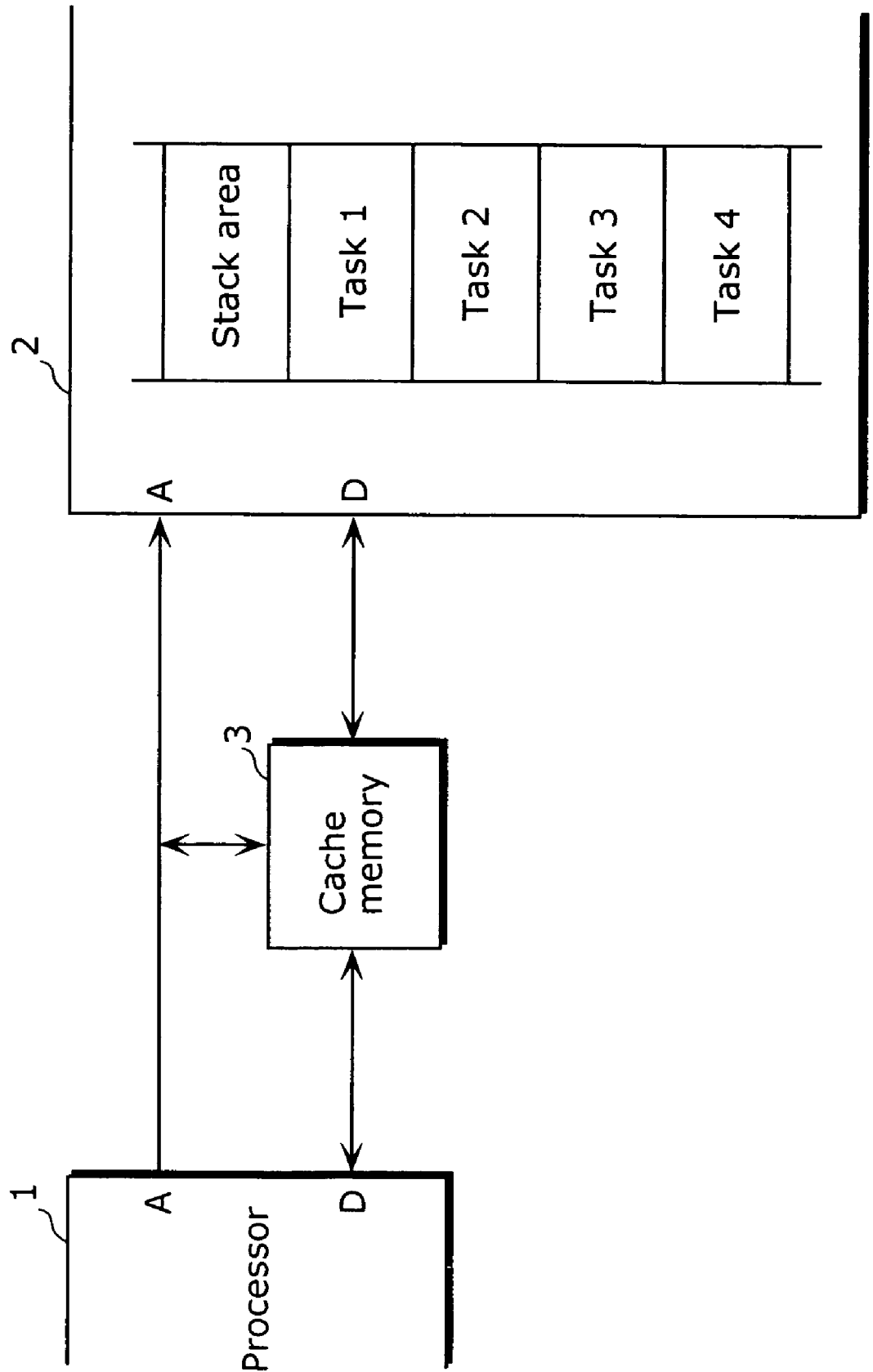
FIG. 1 is a block diagram showing the outline structure of a system including the processor, the cache memory, and the memory in the first embodiment of the present invention.

FIG. 1 is a block diagram showing an outline structure of a system including a processor 1, a cache memory 3, and a memory 2 in the first embodiment of the present invention. In the diagram, the cache memory 3 is included in a system having the processor 1 and the memory 2. The processor 1 is a processor which carries out multi-task control, and which switches and executes tasks 1 to 4 and so on, which are found within the memory 2. The cache memory 3 is an N-way set-associative cache memory which places in a correspondence, one or more ways among N ways, for each of the task, and activates a corresponding way during the execution of a respective task. For the respective tasks, all functions of the cache memory can be used with respect to an active way. Furthermore, for the respective tasks, the functions from among all the functions of the cache memory that can be used is restricted, with respect to a way that is not active (referred to as an inactive way). In the present embodiment, it is assumed that, with respect to an inactive way, replacement function is restricted, while the rest of the functions such as reading, writing, and so on, are not.

Hereinafter, the structure in the case where the present invention is applied to an 8-way set-associative cache memory shall be described as a specific example of the cache memory 3.

Figure 2:
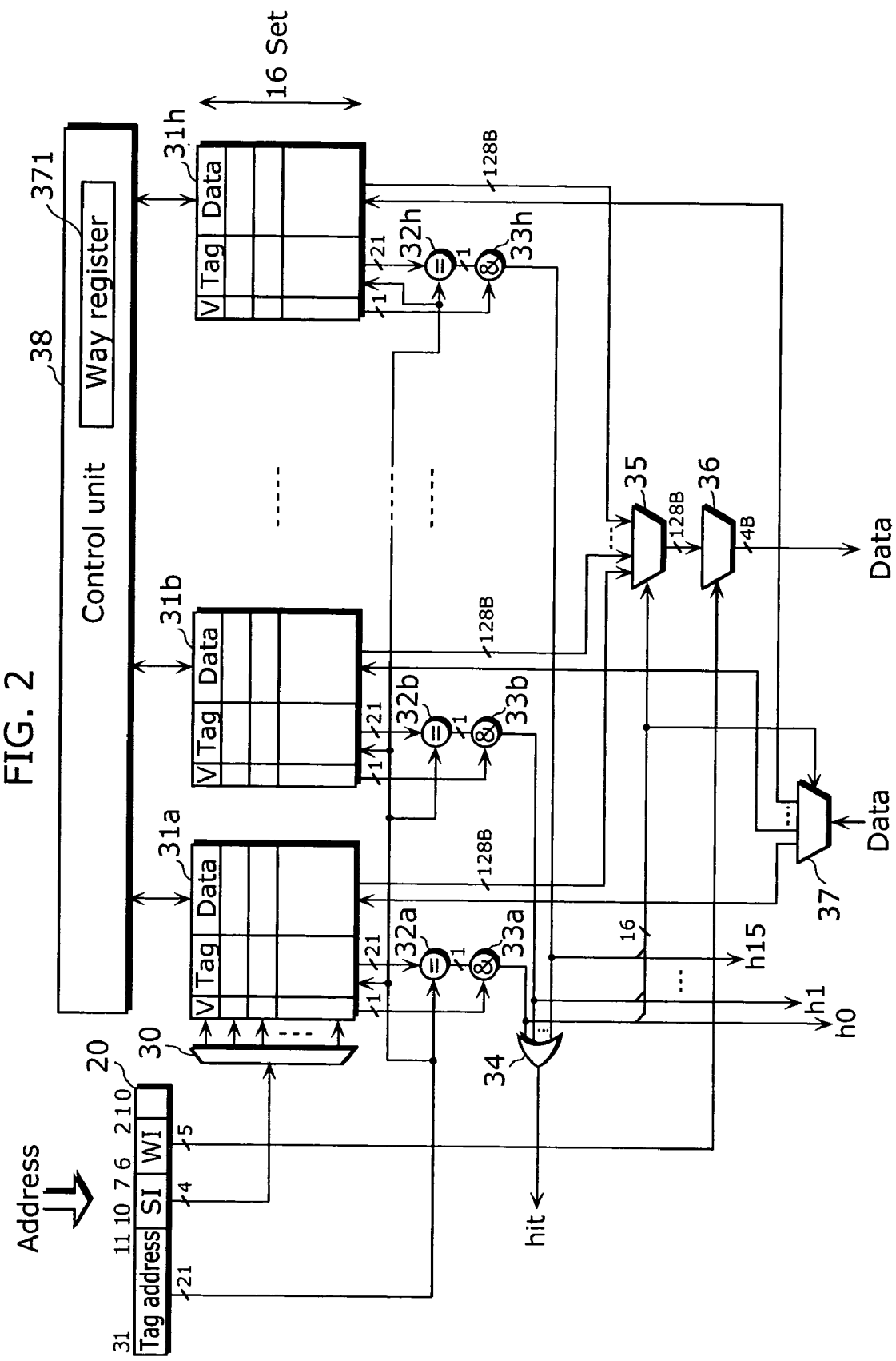
FIG. 2 is a block diagram showing an example of the structure of a cache memory.

FIG. 2 is a block diagram showing an example of the configuration of the cache memory 3. In the diagram, the cache memory 3 includes an address register 20, a decoder 30, eight ways 31a to 31h (hereinafter, abbreviated as ways 0 to 7), eight comparators 32a to 32h, eight AND circuits 33a to 33h, an OR circuit 34, a selector 35, a selector 36, a demultiplexor 37, and a control unit 38.

The address register 20 is a register which holds an access address to the memory 2. Such access address is assumed to be of 32 bits. As shown in the same diagram, the access address includes, in order from the highest bit, a 21-bit tag address, a 4-bit set index (SI in the diagram), and a 5-bit word index (WI in the diagram).

Here, the tag address indicates an area (with a size being the number of sets multiplied by a block) within the memory which is mapped by a way. The size of this area is the size defined by address bits (A10 to A0) which are lower than the tag address, in other words, 2 k bytes, and is also the size of one way. The set index (SI) indicates one of a plurality of sets which straddle the ways 0 to 3. As the set index is 4 bits, the number of sets is sixteen sets. A block which is identified by the tag address and the set index is the unit for replacement, and is referred to as line data or a line when stored in the cache memory. The size of line data is the size defined by the address bits lower than the set index, in other words, 128 bytes. With one word being 4 bytes, one line data is 32 bytes. The word index (WI) indicates one word within plural words making up the line data. The lowest 2 bits (A1, A0) within the address register 20 are disregarded during word accessing.

The decoder 30 decodes the 4 bits of the set index, and selects one set from among the sixteen sets, made up of respective cache entries located in the same sequential positions in the eight ways 0 to 7.

The ways 0 to 7 are eight ways with the same structure, and with a capacity of 8×2k bytes. The way 0 has sixteen cache entries. A cache entry holds a valid flag V, a 21-bit tag, and 128-byte line data. The valid flag V indicates whether or not the cache entry is valid. The tag is a copy of the 21-bit tag address. The line data is a copy of 128-byte data within a block identified by the tag address and the set index. Furthermore, the ways 1 to 7 are the same as the way 0. Four cache entries straddling four ways selected according to the 4 bits of the set index, via the decoder 30, are referred to as a set. Furthermore, in the same diagram, a dirty flag which indicates that writing has taken place, is omitted.

The comparator 32a compares whether or not the tag address within the address register 20 matches the tag of the way 0 among the four tags included in the set selected according to the set index. Aside from corresponding to the ways 31b to 31h respectively, everything else is the same for the comparators 32b to 32h.

The AND circuit 33a compares whether or not the valid flag matches the comparison result from the comparator 32a. The result of this comparison shall be assumed to be h0. In the case where the comparison result h0 is 1, this means that there exists line data corresponding to the tag address within the address register 20 and the set index, in other words, a hit has occurred in the way 0. In the case where the comparison result h0 is 0, this means that a mishit has occurred. Aside from corresponding to the ways 31b to 31h respectively, everything else is the same for the AND circuits 33b to 33h. Respective comparison results h1 to h7 represent a hit or miss occurring in the ways 1 to 7.

The OR circuit 34 obtains the OR for the comparison results h0 to h3. The result of this OR is assumed as a hit. A hit indicates whether or not a hit occurs in the cache memory.

The selector 35 selects, among the line data of the ways 0 to 7 in the selected set, the line data of the way in which a hit occurs.

The selector 36 selects, within the 32-word line data selected by the selector 35, one word which is indicated by the word index.

The demultiplexor 37 outputs, during writing of data into the cache entry, one piece of write data to the ways 0 to 7. The write data may be in 1-word units.

The control unit 38 includes, internally, a way register 371, and performs the overall control of the cache memory. The way register 371 is a register which holds data indicating the active ways among the ways 0 to 7. The control unit 38 controls all the cache memory functions without restrictions with respect to the active ways indicated by the way register 371, while restricting the replacement function with respect to inactive ways.

Figure 3:
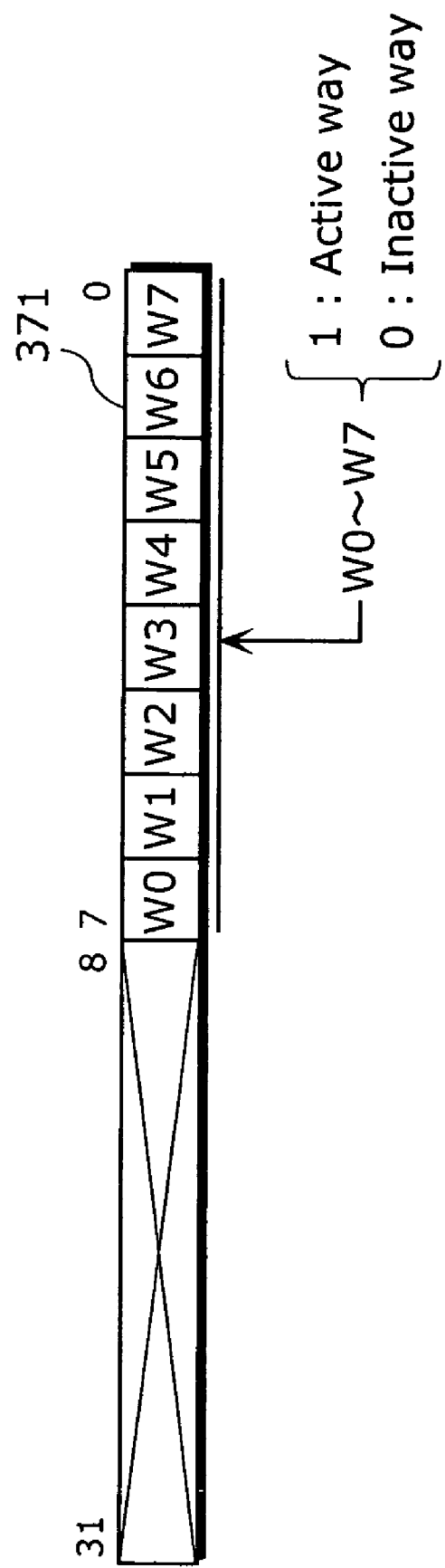
FIG. 3 is a diagram showing the bit structure of a way register.

FIG. 3 is a diagram showing the bit structure of the way register 371. In the diagram, the way register 371 is a 32-bit register which holds, in the lowest 8 bits, a W0 flag to W7 flag which correspond to the ways 0 to 7 respectively. For example, when the W0 flag shows 1, it indicates that the way 0 is an active way, and when it is 0, it indicates that the way 0 is an inactive way. The same is true for W1 flag to W7. Hereinafter, the set of the W0 flag to W7 flag shall be referred to as active way data. The way register 371 allows direct reading and writing from the processor 1, and serves as part of the context of each task. In other words, it has active way data for each task and, with a task-switching, the contents of the way register 371 is rewritten with the active way data corresponding to the task being executed.

FIG. 4 is an explanatory diagram showing correspondence relation of the way register 371 and the ways. On the left-side of the diagram, the active way data held in the way register 371 is "00111000", thus the ways 2, 3 and 4 are active, and the ways 0, 1, 5, 6 and 7 are inactive. On the occasion of a task switch, the way register 371 is re-written with the active data as shown on the right-side of the same diagram, for example. On the right-side of the same diagram, the ways 5 to 7 are active, and the ways 0 to 4 are inactive.

Figure 5:
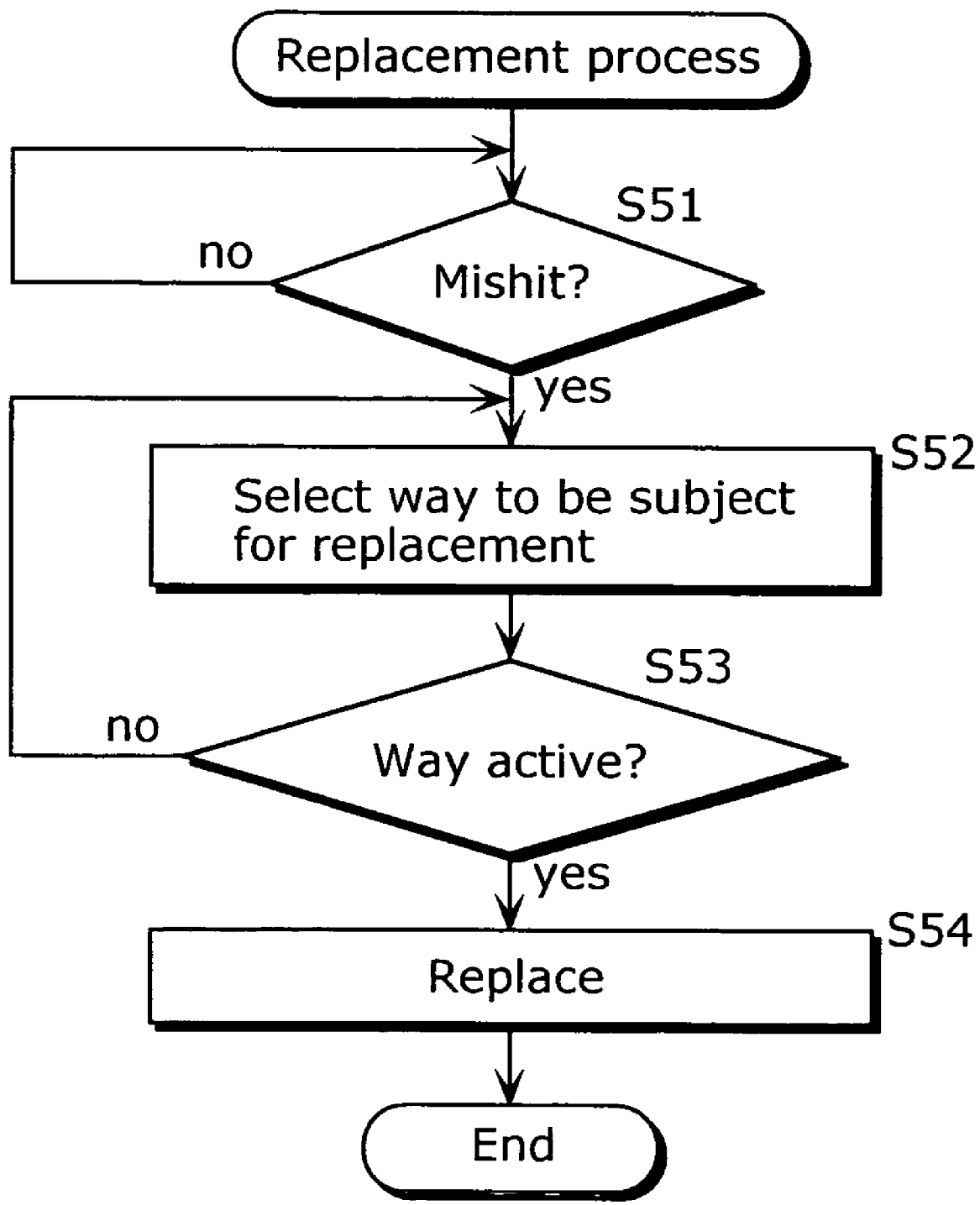
FIG. 5 is a flowchart showing the replacement by the control unit.

FIG. 5 is a flowchart showing the replacement by the control unit 38. In the same diagram, the control unit 38 judges whether or not a mishit has occurred (S51). In the case where it is judged that a mishit has occurred, the control unit 38 selects one subject for replacement from among the cache entries of the four ways in the set selected according to the set index (Step S52). Such replacement-subject selection may utilize the LRU scheme.

In addition, the control unit 38, referring to the way register 371, judges whether or not the selected way is active (S53) and, when not active, returns to step S52 and again selects a cache entry of another way. The control unit 38 replaces the cache entry of an active way that is selected (S54).

In this manner, the control unit 38 restricts replacement with respect to an inactive way indicated in the way register 371, and controls all the cache memory functions without restricting replacement with respect to an active way. Here, the restriction on the replacement process is assumed to be the prohibition of replacement.

Figure 6:
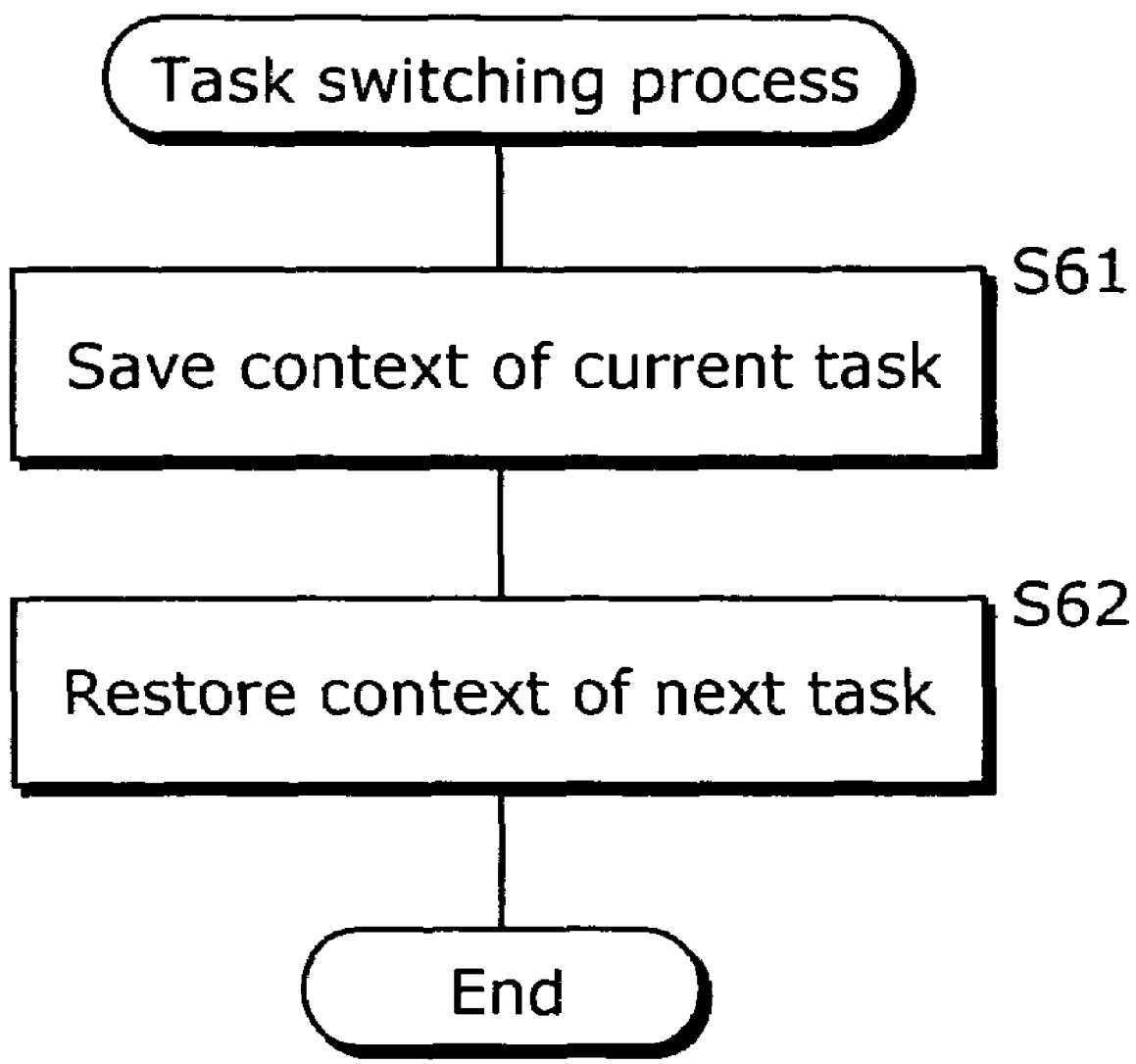
FIG. 6 is a flowchart showing the task switching process.
Figure 7:
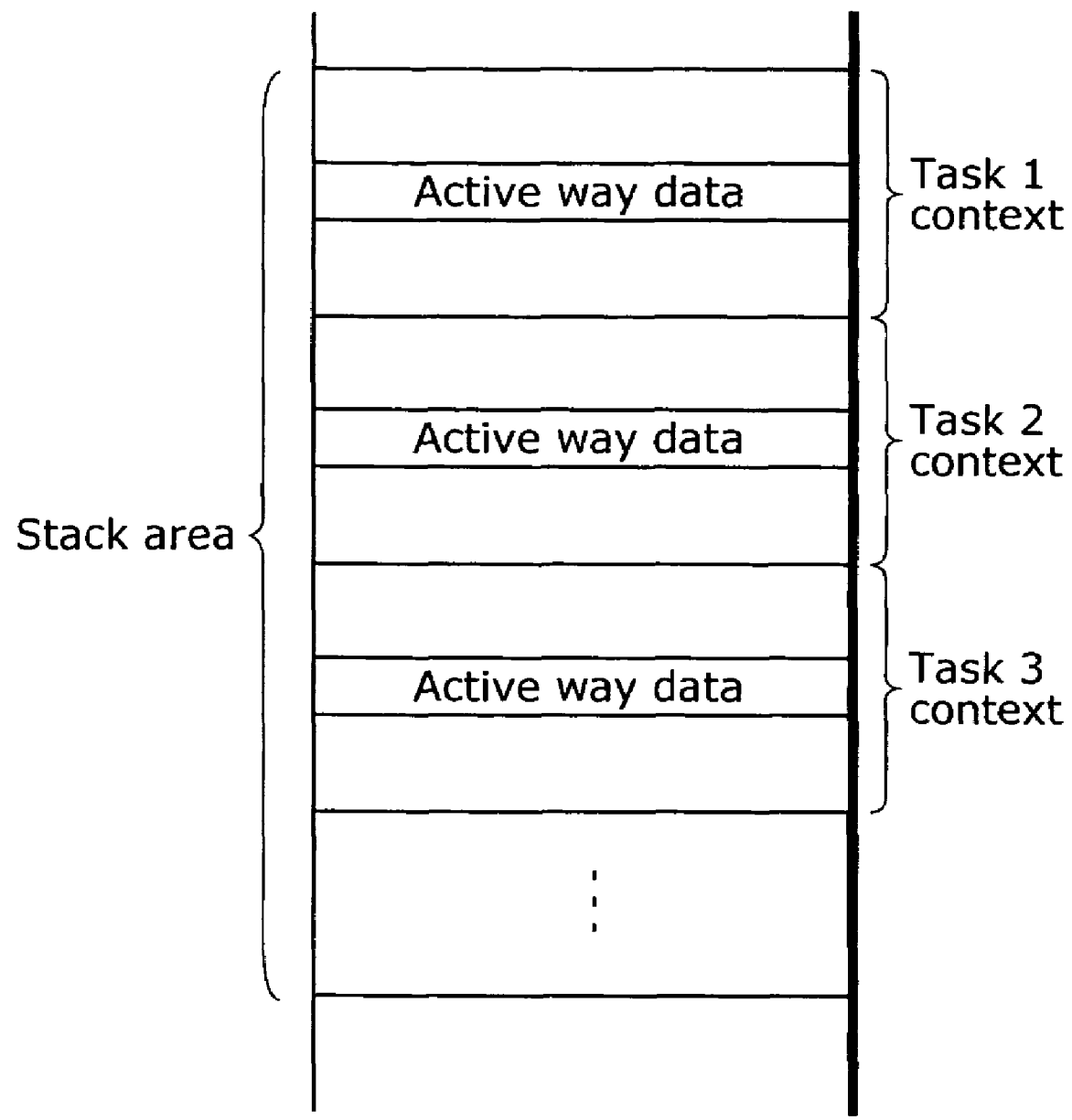
FIG. 7 is a diagram showing way data for respective tasks, included in the context in the task area.

FIG. 6 is a flowchart showing the task replacement for the processor 1. Task switching is activated by the passing of time, the occurrence of an event, and the like. In the same diagram, the processor 1 saves the context of a currently executed task into, for example, a stack area within the memory 2 (Step S61), and restores, from the stack area, the context of a task to be executed next (Step S62). Here, as shown in FIG. 7, the stack area is an area, maintained in the memory 2, for storing the context of each task. The context of each task includes data of general registers of the processor, and data of miscellaneous control registers. In addition, in the present embodiment, it includes the active way data stored in the way register.

In this manner, since the way register 371 is rewritten during task switching, it always holds active way data corresponding to the task currently being executed.

As described above, according to the cache memory in the present embodiment, in terms of a task to be executed by the processor 1, reading and writing to the cache memory is possible with respect to an active way and an inactive way. However, in the case of a mishit, the way which becomes the subject for replacement is restricted to an active way.

For example, assuming that, in FIG. 4, the left-side shows the active ways during the execution of task 1, and the right-side shows those during the execution of task 2. As the execution of the tasks progresses, cache data for the task 1 is progressively stored in the ways 2 to 3, and cache data for the task 2 is progressively stored in the ways 4 to 7. Stated differently, the cache data for the task 1, stored in the ways 2 to 3, is not evicted (not replaced) with the execution of the task 2. Furthermore, the cache data for the task 2, stored in the ways 4 to 7, are not evicted (not replaced) with the execution of the task 1 (not replaced). As a result, it is also possible to eliminate the situation in which the cache data needed for the task 1 is replaced, due to another task, following task switching, and then such evicted data is replaced back into the cache when the task 1 is executed again. As a result, the occurrence of replacement following task switching can be reduced, and the influence from other tasks can be suppressed.

<Variations>

It should be noted that the cache memory in the present invention is not limited to the structure in the aforementioned embodiment, and that different kinds of variations are possible. Hereinafter, a number of variations shall be described.

(1) With regard to the correspondence relations of a plurality of tasks and a plurality of ways, it is possible to have a mix of ways which are monopolized by a single task, and ways which are shared by a plurality of tasks. For example, in FIG. 4, assuming that the ways 2 to 4 are monopolized by the task 1, the ways 5 to 7 are monopolized by the task 2, and the ways 0 and 1 are shared by other tasks. In this case, the tasks 1 and 2, reduce cache misses caused by task switching by monopolizing ways, and are suited for processes requiring real-timeliness. The tasks other than the tasks 1 and 2 are suited for processes not requiring real-timeliness, and the like.

(2) Although, in the aforementioned embodiment, the control unit 38 controls all functions of the cache memory with respect to an active way, and prohibits replacement with respect to inactive ways, the present invention is not limited to such.

For example, the control unit 38 may prohibit status updating with respect to an inactive way indicated in the way register 371. For example, by prohibiting the updating of flags, and the like, representing the status of a way, it is possible to inhibit the influences brought about by task switching, on an inactive way.

Furthermore, the control unit 38 may also prohibit the updating of information indicating an access order, with respect to an inactive way indicated in the way register 371. With this, since the updating of information indicating the access order is prohibited, the order of replacement is not influenced by the execution of other tasks.

Alternatively, the control unit 38 may prohibit all the functions, with respect to an inactive way. In this case, an output enable signal may be disabled so as to prohibit a tag output for the inactive ways. In so doing, the power consumption of an inactive way can be reduced. Furthermore, in the case where all functions are to be prohibited, it is preferable to place the tasks and ways in a correspondence with each other so that the respective tasks do not share, but rather, monopolize a way. In so doing, it is possible to prevent an inconsistency of data from arising between the memory and the cache memory.

Furthermore, in addition to prohibiting replacement, the control unit 38 may also be structured so as not to update LRU order data indicating the access order.

(3) It is also possible to adopt a structure where the access order information to be used in the LRU scheme is reset when the contents of the way register 371 is updated.

(4) Furthermore, instead of prohibiting replacement, the control unit 38 may limit the number of replacements; and may also prohibit replacement with respect to a specific cache entry within a way while performing replacement with respect to the rest of the cache entries.

(5) Although, in the aforementioned embodiment, description is carried out exemplifying an 8-way set-associative cache memory, the number of ways may be four ways, sixteen ways, or any number of ways. In addition, although in the aforementioned embodiment, an example having sixteen for the number of sets is described, any number of sets is possible.

(6) Although, in the aforementioned embodiment, explanation is carried out exemplifying a set-associative cache memory, a fully associative cache memory is also possible. The fully associative cache memory can be considered as a case where there is only one set.

(7) The active way data shown in FIG. 4 may be assigned on a per task basis by an OS. More specifically, when generating a task to be executed, the OS assigns the way that should be made active for such task, and generates the active way data for such task, based on the result of such assignment. In addition, the OS may set the generated active way data in a part of the context data of such task.

(8) In the case where a plurality of tasks shares memory data, the exact same way should be shared by such tasks. For example, in the case where task A and task B share memory data, when the ways 5, 6 and 7 are assigned to the task A, the OS may also assign the ways 5, 6 and 7 to the task B.

Second Embodiment

Although, in the first embodiment, the way register 371 is described as being rewritten due to task switching, the present embodiment describes a structure in which a task is identified in the cash memory, and the way register 371 is rewritten depending on the result of the identification. In addition, although in the first embodiment, the commonly known LRU scheme is adopted as the replacement algorithm, the present embodiment describes a structure which carries out a pseudo-LRU scheme using a 1-bit flag in place of the data indicating the access order.

Figure 8:
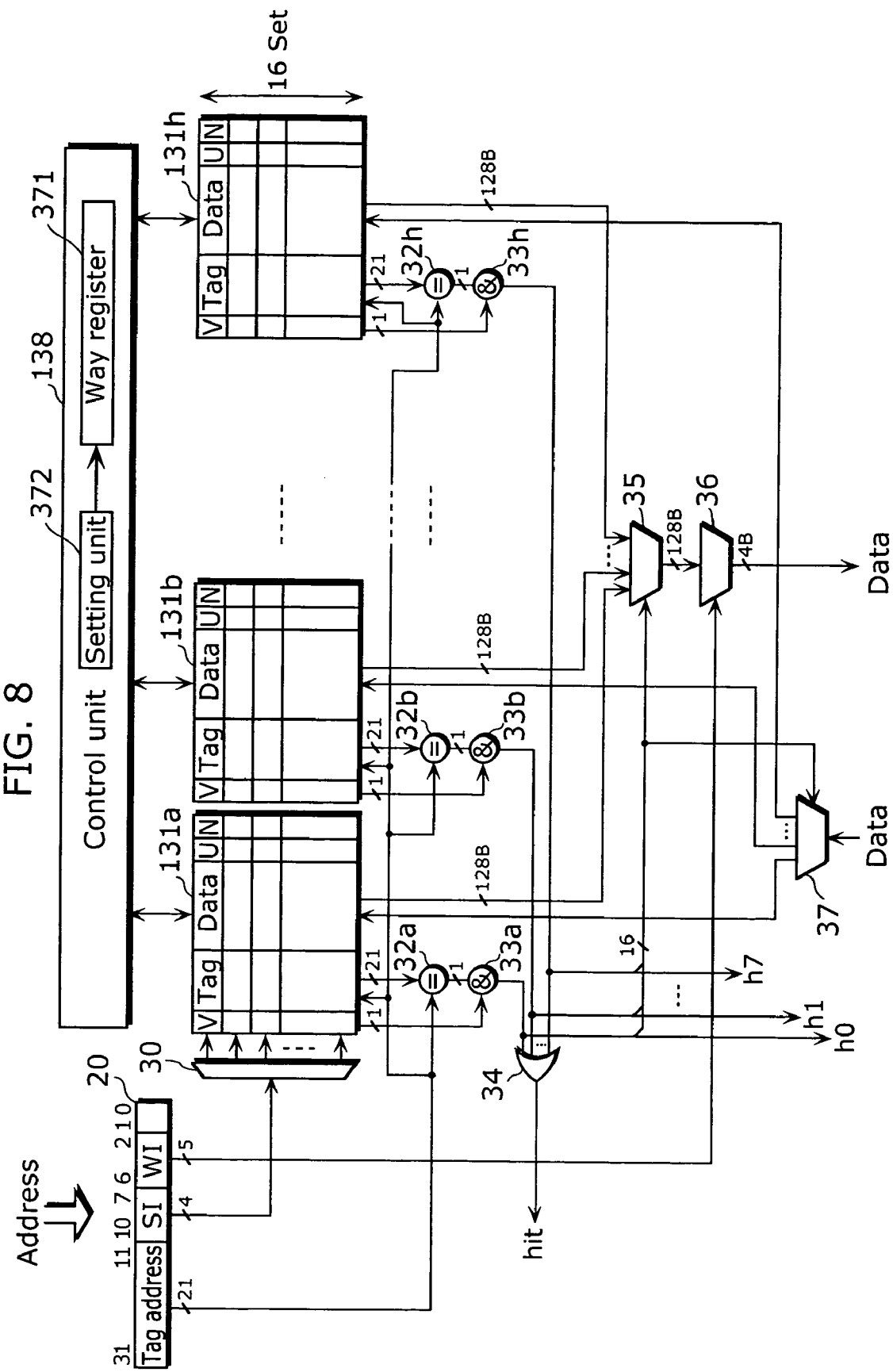
FIG. 8 is a block diagram showing the structure of the cache memory in the second embodiment of the present invention.

FIG. 8 is a block diagram showing the structure of the cache memory in the second embodiment of the present invention. The cache memory in the diagram is different, compared to the structure in FIG. 2, in including ways 131*a* to 131*d* in place of the ways 31*a* to 31*d*, and including a control unit 138 in place of the control unit 38. Hereinafter, description shall be focused on the points of difference, while omitting the points which are the same.

Figure 9:
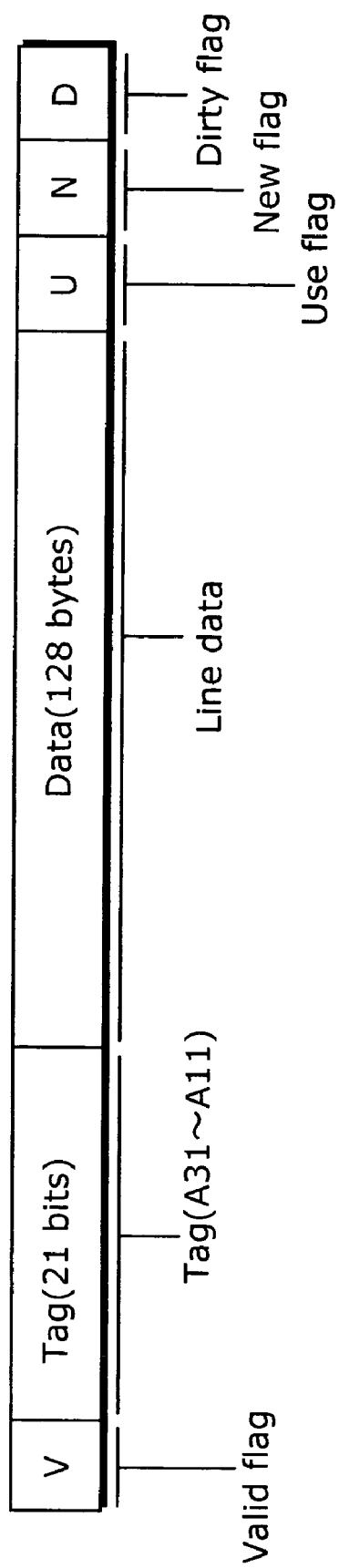
FIG. 9 is a diagram showing the bit structure of a cache entry.

The way 131*a* is different, compared to the way 31*a*, in having a use flag and a new flag added within each cache entry. FIG. 9 shows the bit structure of a cache entry. A cache entry holds a valid flag V, a 21-bit tag, a 128-byte line data, a use flag U, a new flag N, and a dirty flag D. Among these, the use flag U indicates whether or not there has been an access to the cache entry, and is used, in the replacement due to a mishit, in place of an access order for the eight cache entries within a set. More accurately, a 1 in the use flag U means an access, and a 0 in the use flag means no access has been made. As the eight use flags within a set are reset to 0 when all the use flags indicate 1, they become a relative value indicating use or non-use of the eight entries within a set. Stated differently, the use flag U indicates two relative states, namely, whether the time of access is old or new. In other words, it means that a cache entry with a use flag as 1 has been accessed more recently than a cache entry having a use flag as 0. Furthermore, the new flag N is set with a default value of 1 immediately after replacement (or immediately after filing), and is reset to 0 when there is an access to the cache entry. In other words, a new flag N indicating 1 means that the cache entry has not once been accessed since being replaced (or filed), and is in a new state.

The control unit 138 is different, compared to the control unit 38, in having a setting unit 372 added, and in performing the setting of the use flag U and the new flag N.

The setting unit 372 identifies the task being executed in the processor 1, and sets, in the way register 371, active way data corresponding to the identified task.

<Structure of the Setting Unit>

Figure 10:
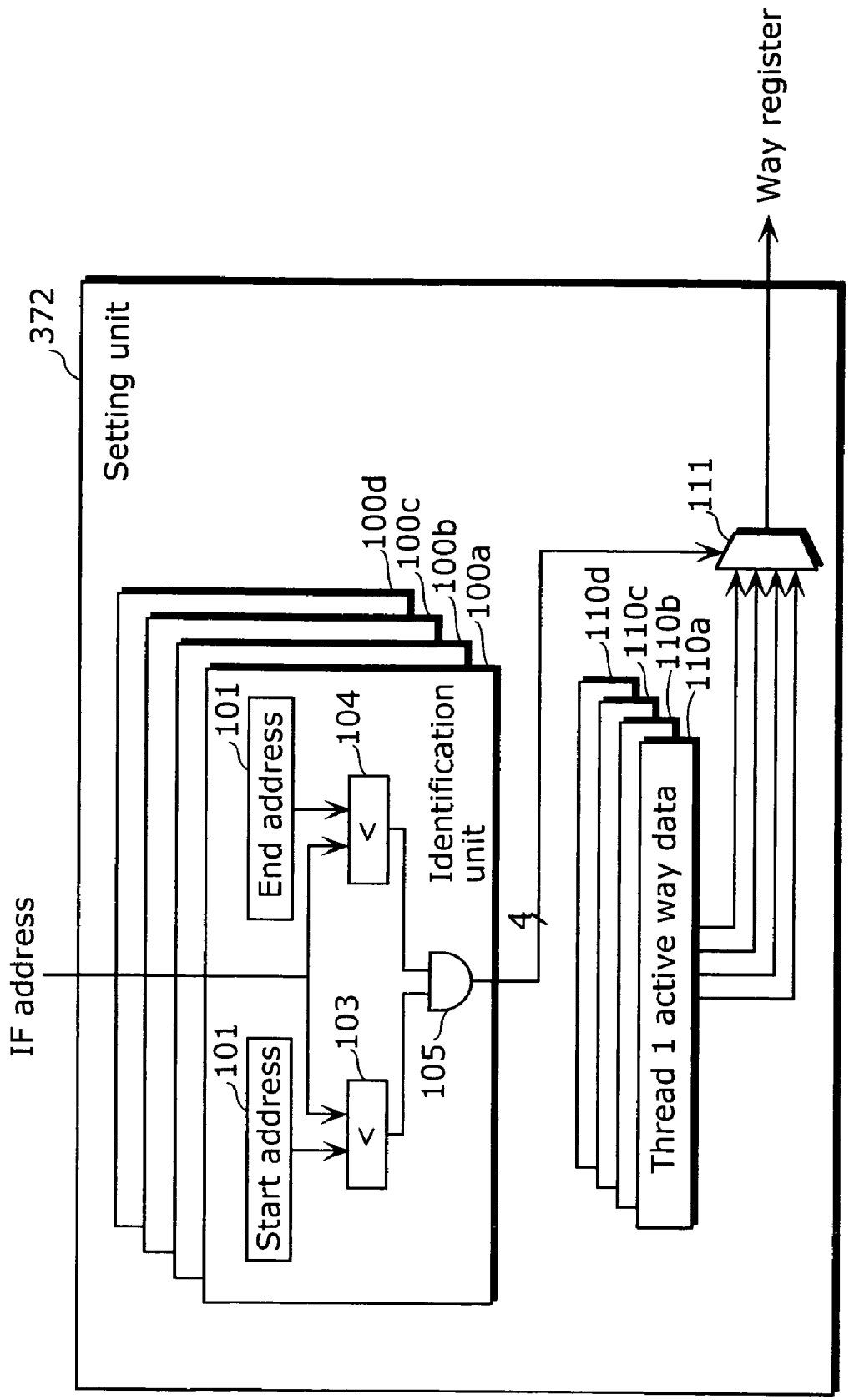
FIG. 10 is a block diagram showing the structure of the setting unit.

FIG. 10 is a block diagram showing an example of the structure of the setting unit 372. In the diagram, the setting unit 372 includes identification units 100*a* to 100*d*, active way data holding units 110*a* to 110*d*, and a selector 111.

The identification unit 100*a* includes a start address holding unit 101, an end address holding unit 102, comparators 103 and 104, and an AND circuit 105; and identifies whether a task being executed is the task 1.

The start address holding unit 101 and the end address holding unit 102 allows reading and writing from the processor 1, and respectively hold the start address and the end address of the task 1, stored in the memory 2. Such start address and end address are written in advance by the processor 1, and can be changed dynamically.

The comparator 103 compares an instruction fetch address (IF address) outputted by the processor 1 and the start address outputted by the start address holding unit 101, and outputs a 1 when the IF address is greater than the start address.

The comparator 104 compares the instruction fetch address (IF address) outputted by the processor 1 and the end address outputted by the end address holding unit 102, and outputs a 1 when the end address is greater than the IF address.

In the case where the comparison results of the comparators 103 and 104 are both 1, in other words, in the case where the IF address fetches the instruction for the task 1, the AND circuit 105 indicates that the task being executed is the task 1.

The same is true for the identification units 100*b* to 100*d*, which identify whether or not a task being executed is the task 2 and 3, respectively.

The active way data holding units 110*a* to 110*d* allow reading and writing from the processor, and hold active way data for the tasks corresponding to the identification units 100*a* to 100*d*. Such active way data is written in advance by the processor 1, and can be changed dynamically.

The selector 111 selects the active way data corresponding to the task being executed, according to the comparison results of the identification units 100*a* to 100*d*, and outputs the selected data to the way register 371. With this, the way register 371 holds active way data corresponding to the task being executed.

<Example of Use Flag Updating>

Figure 11:
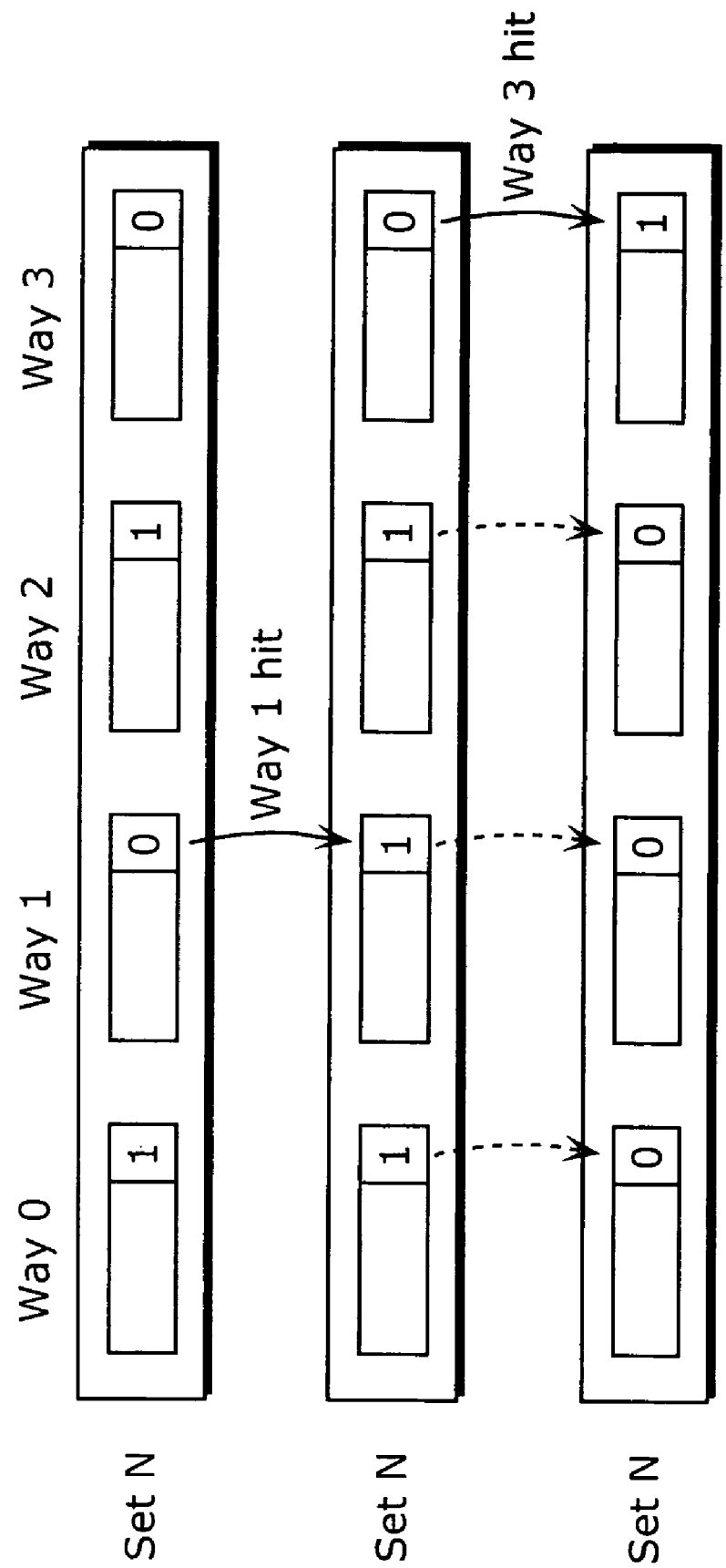
FIG. 11 is an explanatory diagram showing an example of flag updating.

FIG. 11 is an explanatory diagram showing an example of the updating of a use flag U by the control unit 138. In the diagram, the case in which there are four ways, instead of eight ways, is explained for the sake of expediency. The top, middle, and bottom stages of the diagram represent four cache entries making up a set N which straddles ways 0 to 3. The 1 or 0 at the right end of the four cache entries are respective use flag values. The four use flags U are written as U0 to U3.

In the top stage of the diagram, (U0 to U3)=(1, 0, 1, 0), which means that there was an access to the respective cache entries of the ways 0 and 2, and no access to the respective cache entries of the ways 1 and 3.

In this situation, when a hit occurs in the cache entry of the way 1 within the set N during a memory access, an update (U0 to U3)=(1, 1, 1, 0) is made, as shown in the middle stage in the diagram. More specifically, as shown by the solid line, the use flag U1 of the way 1 is updated from 0 to 1.

In addition, in the situation shown in the middle stage in the diagram, when a hit occurs in the cache entry of the way 3 within the set N during a memory access, an update (U0 to U3)=(0, 0, 0, 1) is made. More specifically, as shown by the solid line, the use flag U1 of the way 3 is updated from 0 to 1. In addition, as shown by the broken lines, the use flags, U0 to U2, other than that for the way 3, are updated from 1 to 0. With this, it means that the cache entry of the way 3 has been accessed more recently than the respective cache entries of the way 0 to 2.

At the time of a cache miss, the control unit 138 determines, based on the use flags, the cache entry to be replaced, and carries out replacement. For example, the control unit 138 determines, in the top stage in FIG. 11, either of the way 1 or the way 2 to be the subject for replacement; determines, in the middle stage in FIG. 11, that the way 3 is to be replaced; and determines, in the bottom stage in FIG. 11, any one of the ways 0 to 2 as the subject for replacement.

<Use Flag and New Flag Updating Process>

Figure 12:
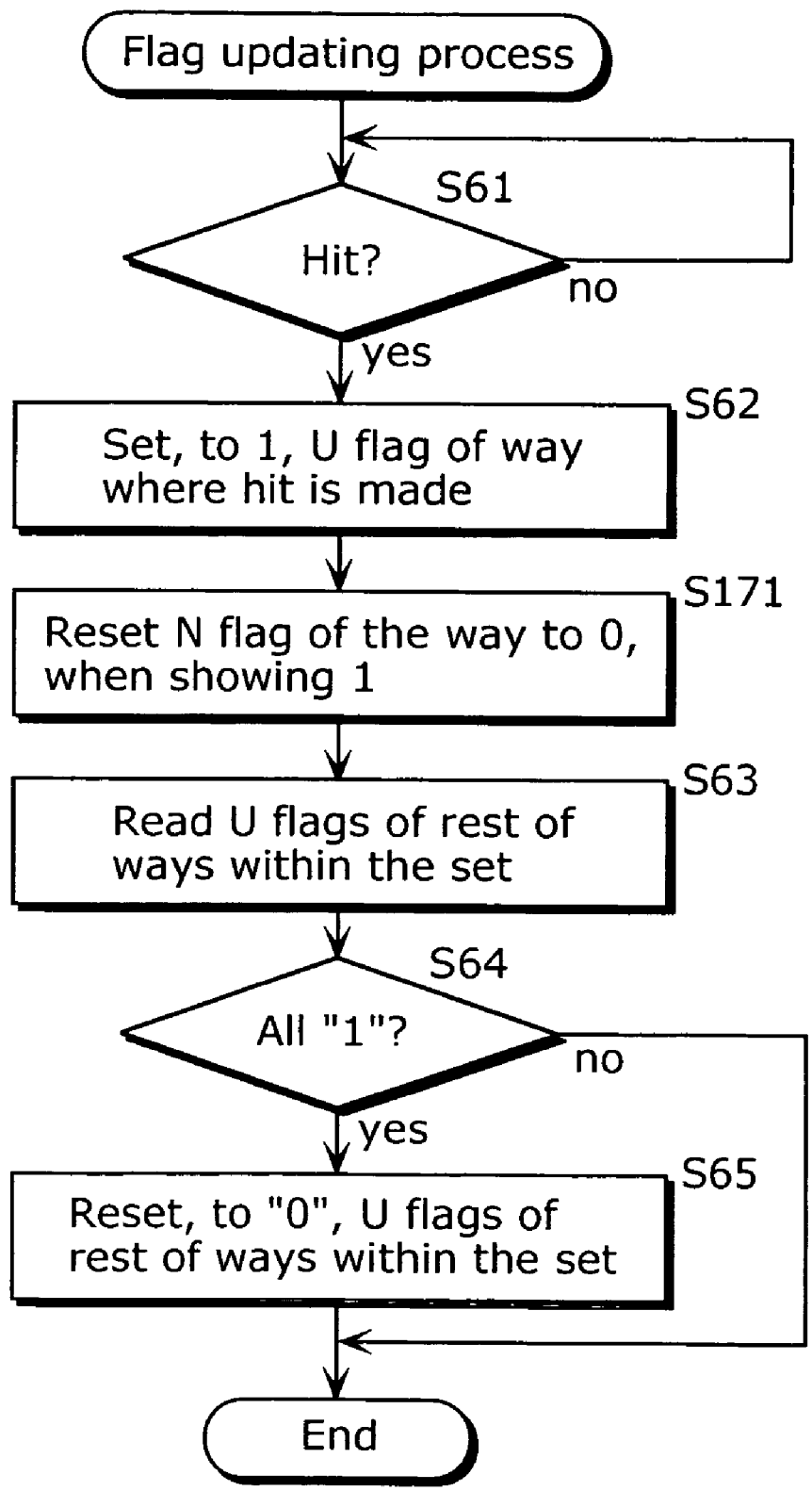
FIG. 12 is a diagram showing the flow of the flag updating process.

FIG. 12 is a flowchart showing the flag updating by the control unit 138, for the use flag and new flag. In the diagram, it is assumed that for a cache entry having a valid flag as 0 (invalid), the use flag U is initialized to 0.

In the diagram, when a cache hit occurs (Step S61), the control unit 138 sets, to 1, the use flag U of the way, within the set selected according to the set index, where the hit occurred (Step S62), and the new flag of the cache entry of the way, within the selected set, where the hit occurred is reset to 0, when 1 is being shown (Step S171).

In addition, the control unit 138 reads the use flags U of the rest of the ways within such set (Step S63), and judges whether or not the read use flags U all indicate 1 (Step S64). When all do not indicate 1, the process ends; and when all indicate 1, the control unit 138 resets, to 0, all the use flags U of the rest of the ways (Step S65).

In this manner, the control unit 138 updates use flags as in the updating example shown in FIG. 11. Furthermore, the new flag N is reset at the point where a first access is made after the replacement of the cache entry.

<Replacement Process>

Figure 13:
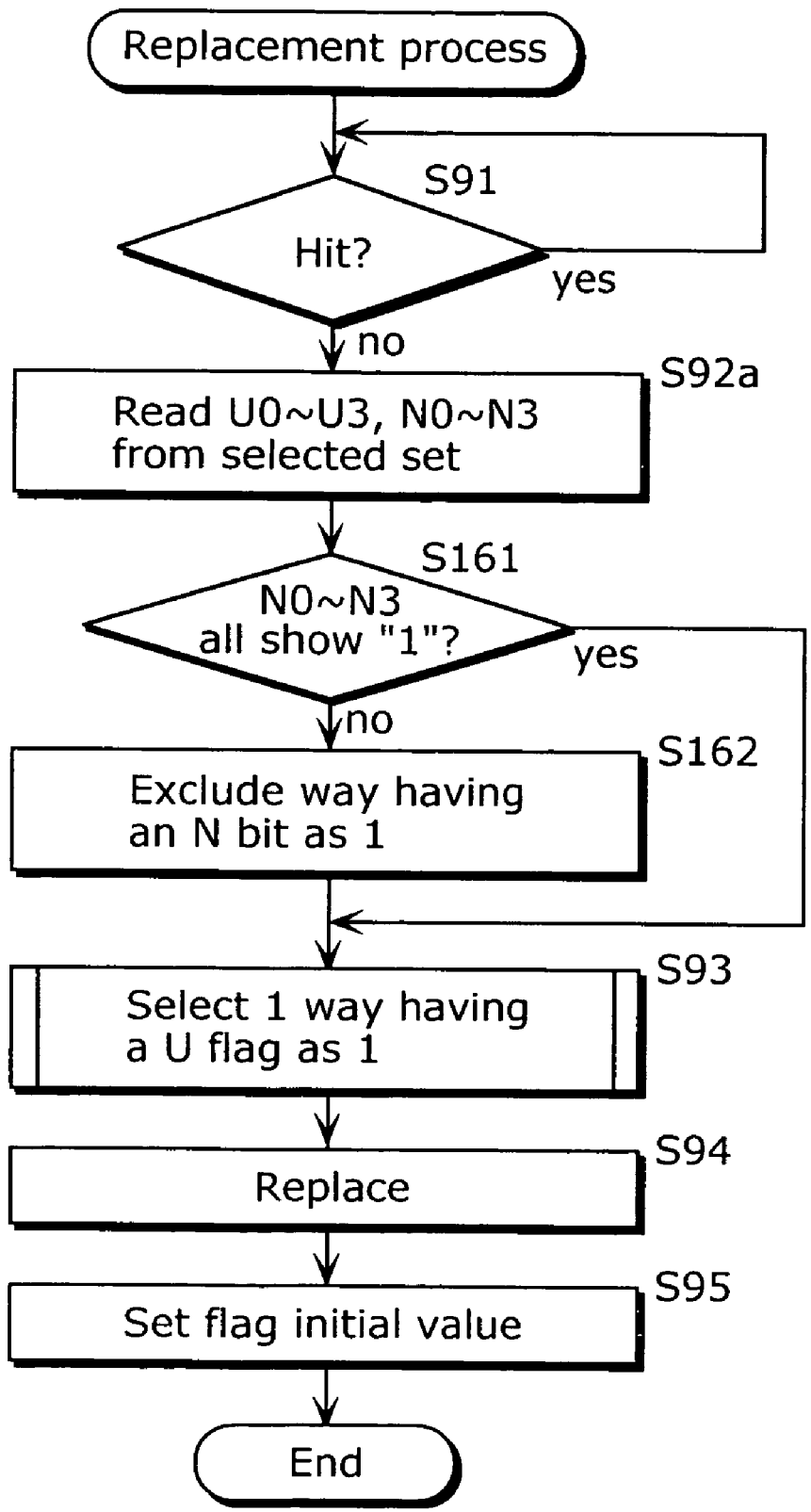
FIG. 13 is a diagram showing the flow of the replacement process.

FIG. 13 is a diagram showing the flow of the replacement by the control unit 38. In the diagram, when a miss occurs in a memory access (Step S91), the control unit 138 reads the eight use flags U and the eight new flags N0 to N7 of the ways in the set selected according to the set index (Step S92), and judges whether or not the eight new flags N0 to N7 all indicate 1 (Step S161). When all indicate 1, the process proceeds to step S93; and when all do not show 1 (a 0 exists), a way having a new flag as 1, among ways having a use flag as 0, is excluded (Step S162).

In addition, the control unit 138 selects one way having a use flag as 0 (Step S93). At this time, when there is a plurality of ways having use flags as 0, the control unit 138 randomly selects one, or alternatively, selects one using a round robin. In addition, the control unit 138 replaces the cache entry of the selected way in the set (Step S94) and, after the replacement, initializes the cache entry's use flag U to 1, and the new flag to 1 (Step S95). Moreover, at this point, the valid flag V and the dirty flag D are initialized to 1 and 0, respectively. Furthermore, in order to select, using the round robin, one way from a plurality of ways having use flags U as 0, the control unit 138 may hold/update, in the register, data indicating a round position (position of the selected way), and select the next round position among ways having a use flag U as 0.

In this manner, the subject for replacement is determined by selecting one cache entry having a new flag as 0 and a use flag as 0. However, in the case where the 8 new flags all indicate 1, one subject for the replacement is selected from among the ways having a new flag as 1 and a use flag U as 0. As this replacement algorithm uses 1-bit use flags in place of the data indicating the access order in the conventional LRU scheme, a pseudo-LRU scheme is possible.

As described thus far, according to the cache memory in the present embodiment, by being equipped with the setting unit 372, the cache memory itself is able to identify the task being executed, and set, in the way register 371, the active way data corresponding to the identified task, and switch the active way on a per task basis. As a result, as in the first embodiment, the occurrence of unnecessary replacement following task switching can be reduced, and the hit ratio can be improved.

Furthermore, according to the cache memory in the present embodiment, 1-bit use flags are provided for each cache entry, in place of the provision of data indicating the access order, for each cache entry, in the conventional LRU scheme. With this, a complex circuit which updates the conventional access order data can be substituted with a simple flag updating circuit (flag updating unit 39). Furthermore, in a replacement unit 40, the subject for replacement can easily be determined through the selection of one cache entry having a use flag as 0. In this manner, according to the cache memory in the present embodiment, hardware dimensions can be greatly reduced. Furthermore, it is possible to obtain approximately the same hit ratio compared with the conventional LRU.

In addition, the control unit 138 in the present embodiment excludes a cache entry from the subject for replacement in the case where its new flag indicates 1. This is due to the following reason. More specifically, although the initial value for the use flag is 1, when the use flags of the rest of the ways become 1, they are reset to 0. In other words, even when a cache entry has a use flag as 0, there are cases where it is not accessed even once after replacement. In the case where the use flag becomes 0 in such manner, there is a possibility that the cache entry which has not once been accessed after replacement is again selected as the subject for replacement, following the occurrence of a cache miss. As such, by providing a new flag N, it is possible to prevent the replacement of a cache entry that has not once been accessed after replacement.

<Variations>

It should be noted that the cache memory in the present invention is not limited to the structure in the aforementioned embodiment, and different kinds of variations are possible. Hereinafter, a number of variations shall be described.

(1) The variations (1) to (6) in the first embodiment may be applied to the present embodiment.

(2) In the case where a task number (or a thread number, a process number, or the like), which indicates a task being executed, is outputted from the processor 1, a task number holding unit which holds and updates a task number may be included in place of the aforementioned identification units 100a to 100d. In such case, the selector 111 may select active way data corresponding to a task number.

(3) As shown in the bottom stage in FIG. 11, when the use flags U of the rest of the ways all show 1, the control unit 138 changes these to 0, and updates, to 1, the use flag U of the way, itself, in which the hit occurred. However, instead of this, the use flag of the way, itself, in which the hit occurred, may also be updated to 0.

(4) When the contents of the way register 371 are updated, the control unit 138 may reset all the use flags. In addition, together with the resetting of the use flags, the control unit 138 may reset the information indicating a round position in the aforementioned round robin for selecting one way from a plurality of ways having a use flag as 0.

(5) It is also possible to have a structure in which the new flag in the aforementioned embodiment is not included.

Third Embodiment

The first and second embodiments disclose a structure in which the unit of replacement in the cache entry is in line (128 byte) units. The present embodiment describes a structure in which the unit of replacement can be switched between a line unit and a sub-line (32 byte) unit, on a per task basis.

Figure 14:
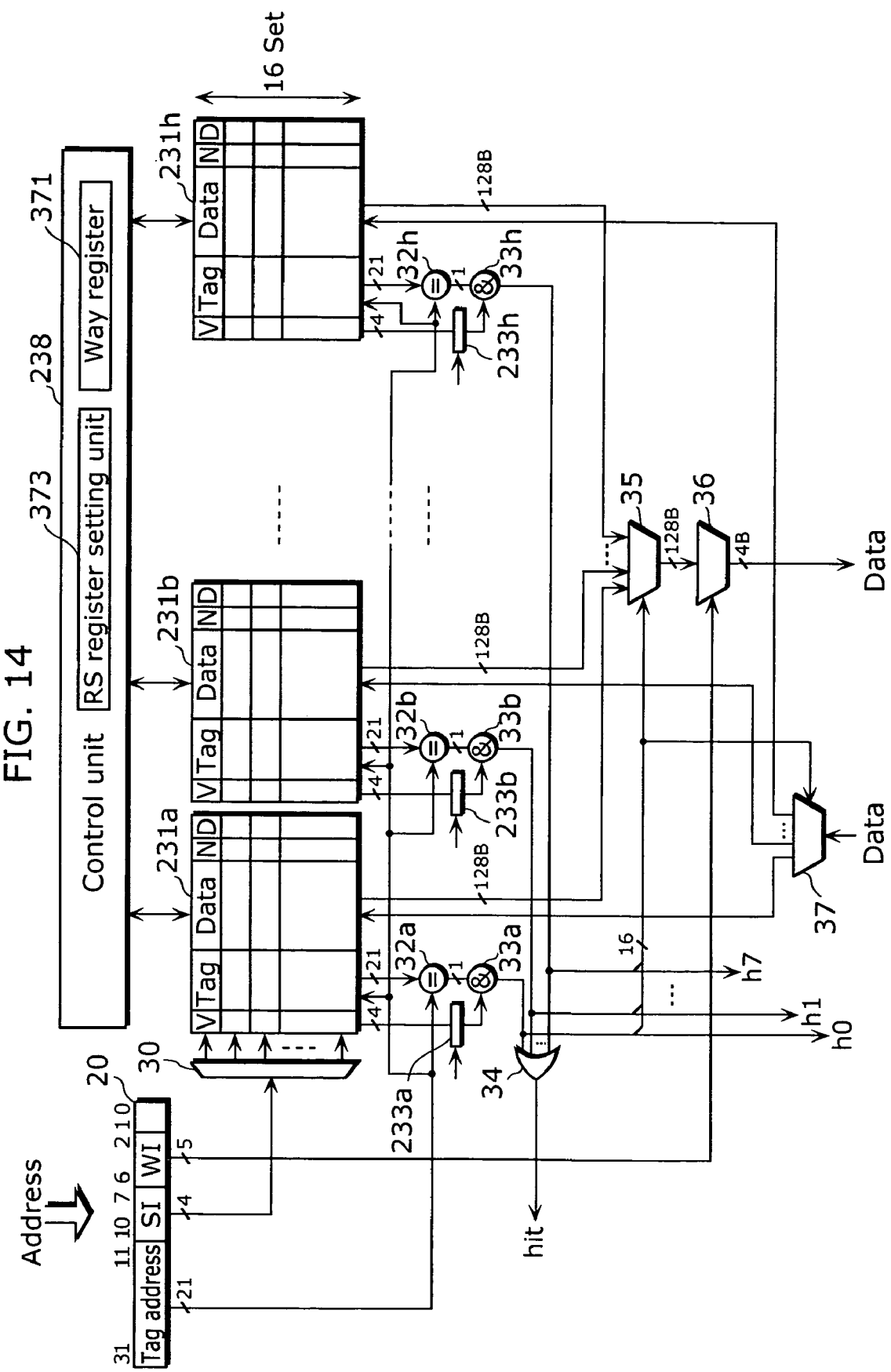
FIG. 14 is a block diagram showing the structure of the cache memory in the third embodiment of the present invention.

FIG. 14 is a block diagram showing the structure of the cache memory in the third embodiment of the present invention. The cache memory in the diagram is different, compared to the structure shown in FIG. 8, in including ways 231a to 231h in place of the ways 131a to 131h, the addition of selectors 233a to 233h, and including a control unit 238 in place of the control unit 138. Hereinafter, description shall be focused on the points of difference, while omitting points which are the same.

Figure 15:
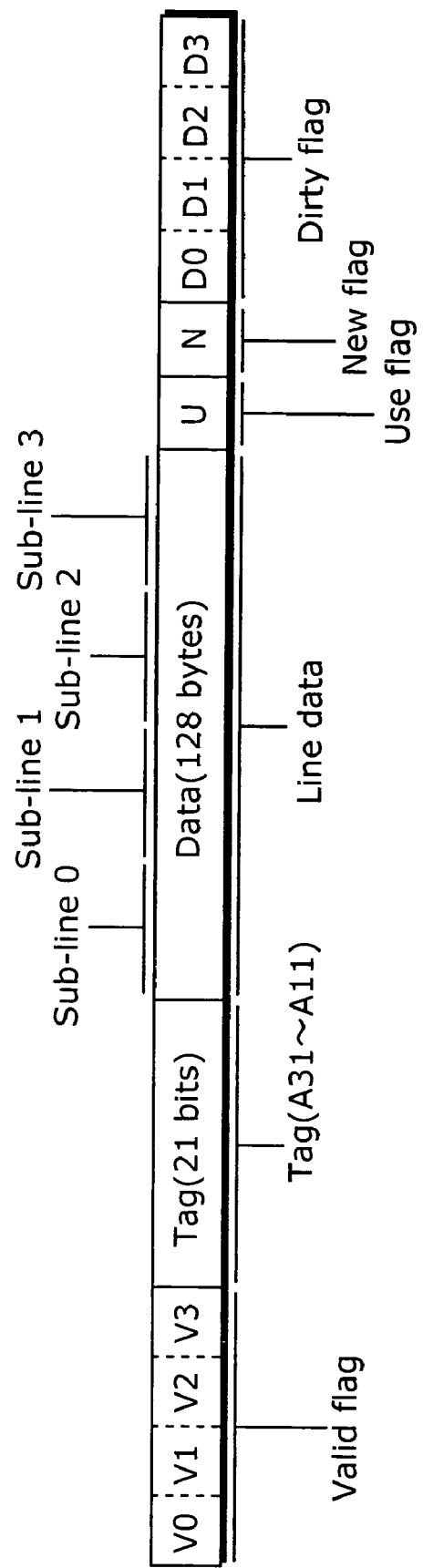
FIG. 15 is a diagram showing the bit structure of a cache entry.

The ways 231a to 231h are different, compared to the ways 131a to 131h in FIG. 8, in that instead of holding 1 bit each for the valid flag and the dirty flag within a cache entry, these are held on a per sub-line basis. FIG. 15 shows the bit structure of a cache entry. As shown in the diagram, a single cache entry holds valid flags V0 to V3, a tag, line data, a use flag U, a new flag N, and dirty flags D0 to D3. As description regarding the use flag U and the new flag N has already been carried out, it shall be omitted here. The line data (128 bytes) is made up of four sub-lines (32 bytes). The valid flags V0 to V3 correspond to the four sub-lines 0 to 3, respectively, and indicate whether or not the corresponding sub-line is valid. The dirty flags D0 to D3 correspond to the four sub-lines 0 to 3, respectively, and indicate whether or not the corresponding sub-lines have been written into. The valid flags and dirty flags are provided on a per sub-line basis so as to allow replacement also on a per sub-line basis. Furthermore, write-back (or write-through) is also possible on a per sub-line basis.

The selector 233a is inputted, from the way 231a, with the valid flags V0 to V3 corresponding to the set selected according to the source index SI, and the highest 2 bits of the word index WI, and selects the valid flag corresponding to the sub-line specified by the highest 2 bits. Aside from corresponding to the ways 231b to 231h respectively, everything else is the same for the selectors 233b to 233h. With this, the selectors 233a to 233h make it possible to judge, on a per sub-line basis, whether or not a hit has occurred.

The control unit 238 is different, compared to the control unit 138, in that the setting unit 372 is eliminated, and an RS (replacement size) register 373 is added.

The setting unit 372 is eliminated since the way register 371 is rewritten in a task switching, as in the first embodiment.

Figure 16:
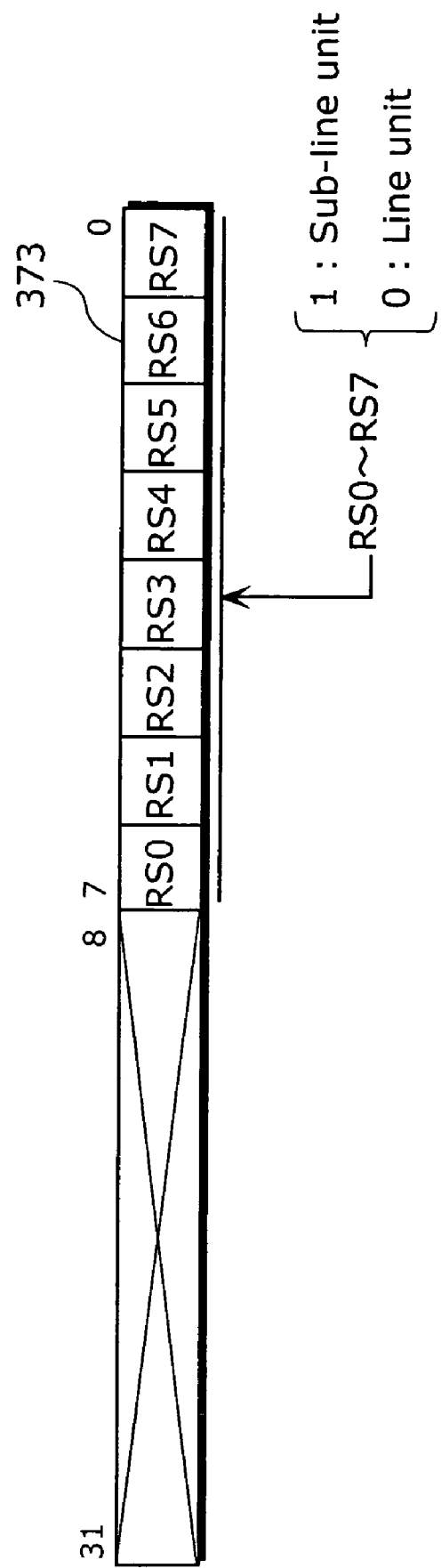
FIG. 16 is a diagram showing the bit structure of the replacement size register.

The RS register 373 holds, for each way, replacement size data indicating replacement size. FIG. 16 shows an example of a bit structure of the RS register 373. As in the diagram, the RS register 373 holds replacement size data made up of RS0 to RS7. The control unit 238 is instructed that the replacement size is a sub-line (32 bytes) when the respective bits of the RS0 to RS7 indicate 1, and instructed that the replacement size is a line (128 bytes) when 0 is indicated. As with the way register 371, the RS register 373 allows reading and writing from the processor and, as a part of the context, is rewritten in task switching. With this, the adoption of a line or sub-line replacement size can be set on a per way basis and a per task basis.

Figure 17:
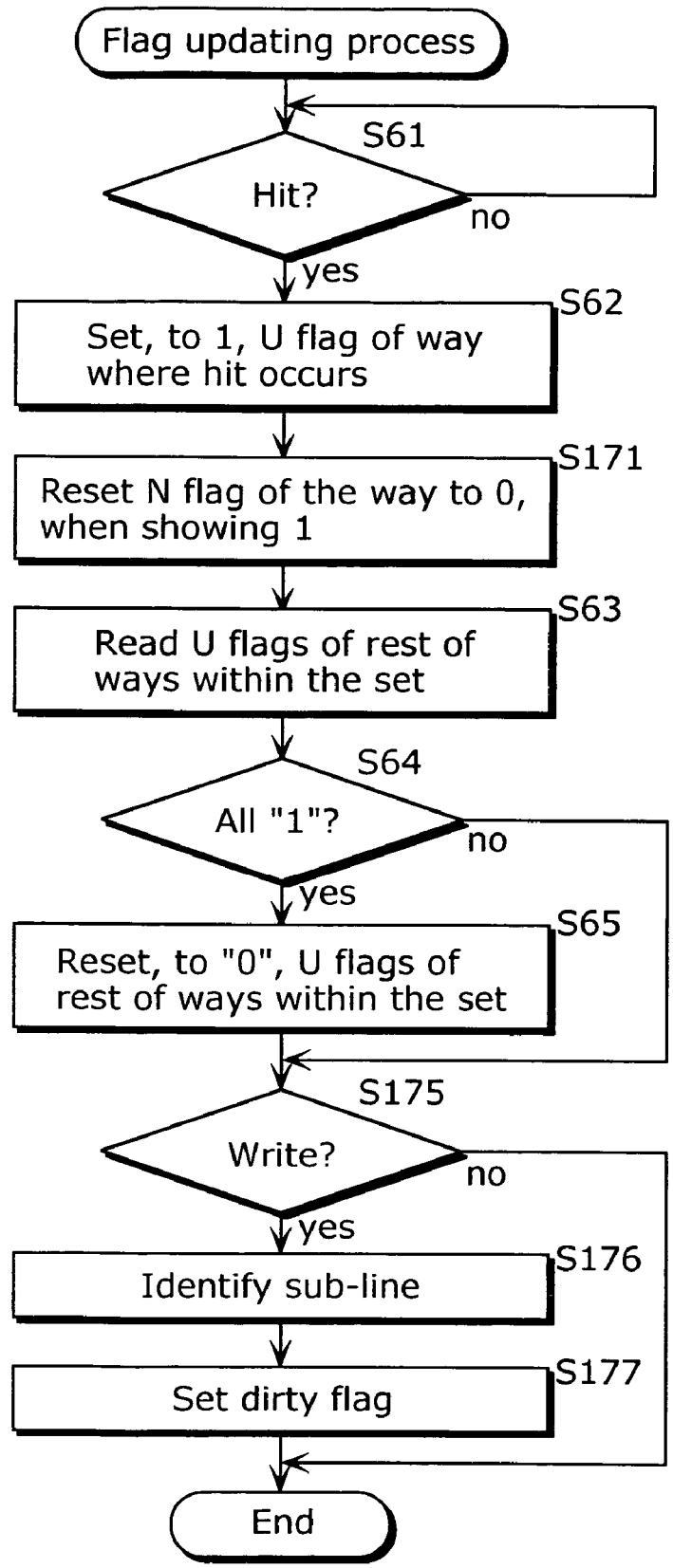
FIG. 17 is an explanatory diagram showing an example of 12-base flag updating.

FIG. 17 is a flowchart showing the flag updating by the control unit 238. The diagram is different, compared to the flowchart shown in FIG. 12, in the addition of steps S175 to S177 for setting dirty flags on a per sub-line basis. More specifically, when the cache memory has been written into (Step S175), the control unit 238 identifies the sub-line which has been written into (Step S176), and sets, to 1, the dirty flag corresponding to the identified sub-line (Step S177). The process in steps S175 to S177 can easily be realized, for example, by equipping the control unit 238 with a 1-input/4-output demultiplexor for each way. Such demultiplexor may have a structure in which a logical "1" is inputted, the 4 outputs are made to correspond to the dirty flags D0 to D3, and the output destination is controlled according to the highest 2 bits of the word index WI.

In this manner, the control unit 238 updates the dirty flags D0 to D3 provided on a sub-line basis, in response to a cache write.

Figure 18:
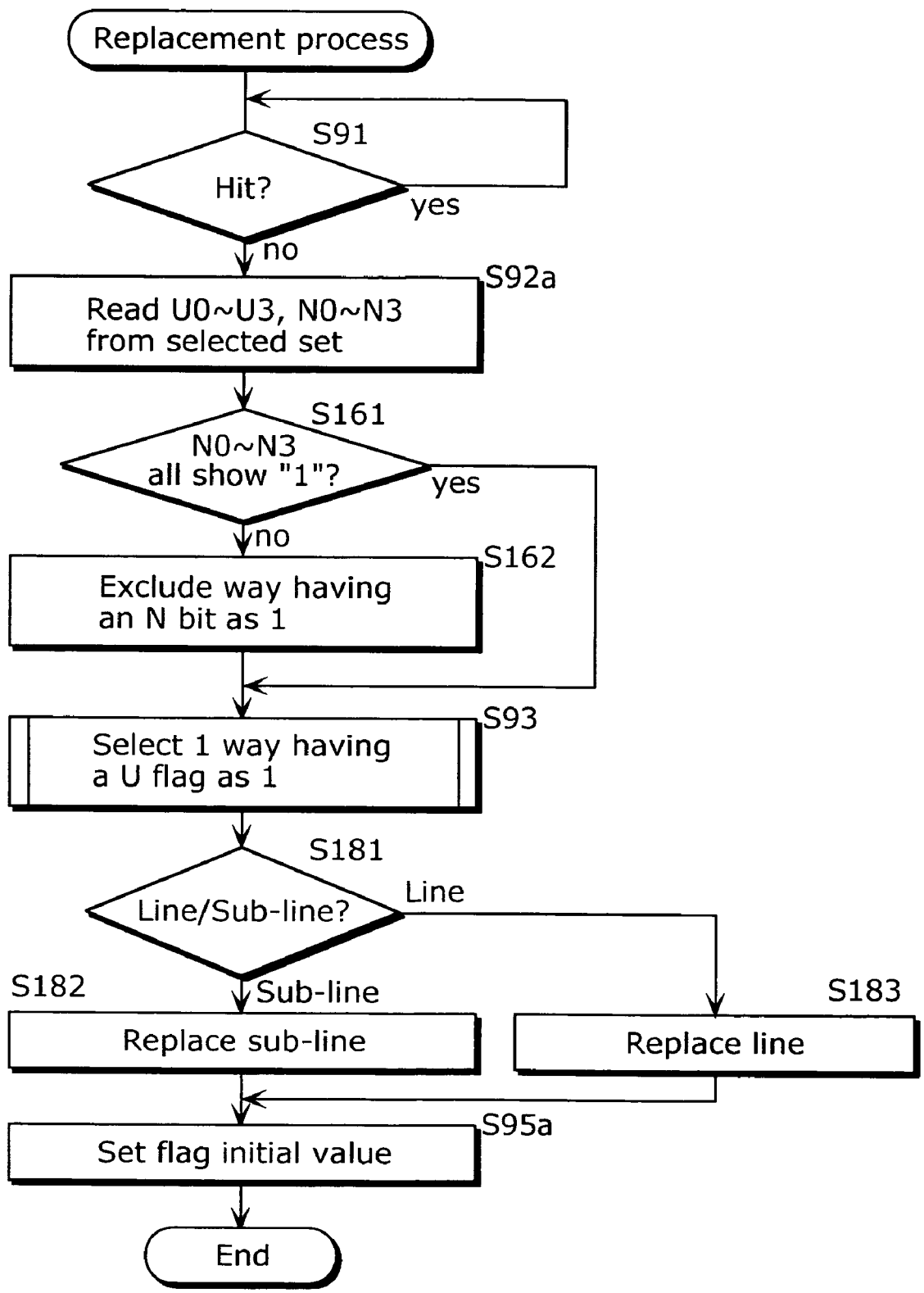
FIG. 18 is a flowchart showing base replacement process.

The FIG. 18 is a flowchart showing the replacement by the control, unit 238. The diagram is different, compared to the flowchart shown in FIG. 13, in having steps S181 to S183 in place of the step S94, and having a step S95a in place of the step S95.

The control unit 238 reads, from the RS register 373, the RS flag corresponding to the way selected in step S93, and judges which of either the line or sub-line is specified as the replacement size (Step S181). The control unit 238 replaces the sub-line of the relevant way when sub-line is specified (Step S182), and replaces the line of the relevant way when line is specified (Step S182). In addition, the control unit 238 initializes the valid flag and the dirty flag corresponding to the replaced sub-line or line (Step S95a). More specifically, the valid flag and dirty flag corresponding to the replaced sub-line are set as 1 and 0, respectively. In the case where replacement is done on a per line basis, the four valid flags and the four dirty flags corresponding to the four sub-lines are set as 1 and 0 respectively.

As described thus far, according to the cache memory in the present embodiment, in addition to the first or the second embodiment, the unit of replacement can be set as a line and sub-line, on a per way basis as well as on a per task basis. Therefore, by switching the unit of replacement depending on the data size required by a task, cache misses can be further reduced. For example, assuming that the task 1 performs decoding/encoding of audio data, and the task 2 performs decoding/encoding of video data. In this case, it is possible to adopt the line size as the unit of replacement for the task 1, and the sub-line as the unit of replacement for the task 2. In so doing, the cache utilization efficiency for the tasks 1 and 2 can be improved. This is because the length of data to be sequentially accessed for task 1 is comparatively long, and the length of data to be sequentially accessed for task 2 is comparatively short.

<Variations>

It should be noted that the cache memory in the present invention is not limited to the structure in the aforementioned embodiment, and different kinds of variations are possible. Hereinafter, a number of variations shall be described.
(1) The variations (1), (3), (4) and (5) in the second embodiment may be applied to the second embodiment.
(2) Although in the present embodiment, the size of a sub-line is made out to be ¼ of the line size, other sizes such as ½, ⅛, 1/16 and so on, are also possible. In such cases, each cache entry may hold the same number of valid flags and dirty flags as the number of sub-lines.

Fourth Embodiment

The first to third embodiments describes an example in which at least replacement is restricted with respect to an inactive way. In the present embodiment, description shall be made regarding a structure which, additionally, prohibits the comparison by a comparator, among the comparators 32a to 32h, which corresponds to an inactive way, and which prohibits the tag output from a cache entry corresponding to the inactive way.

As such, the cache memory in the present embodiment adopts a structure, shown in FIG. 14, in which a comparison control unit 372 is added inside the control unit 238.

Figure 19:
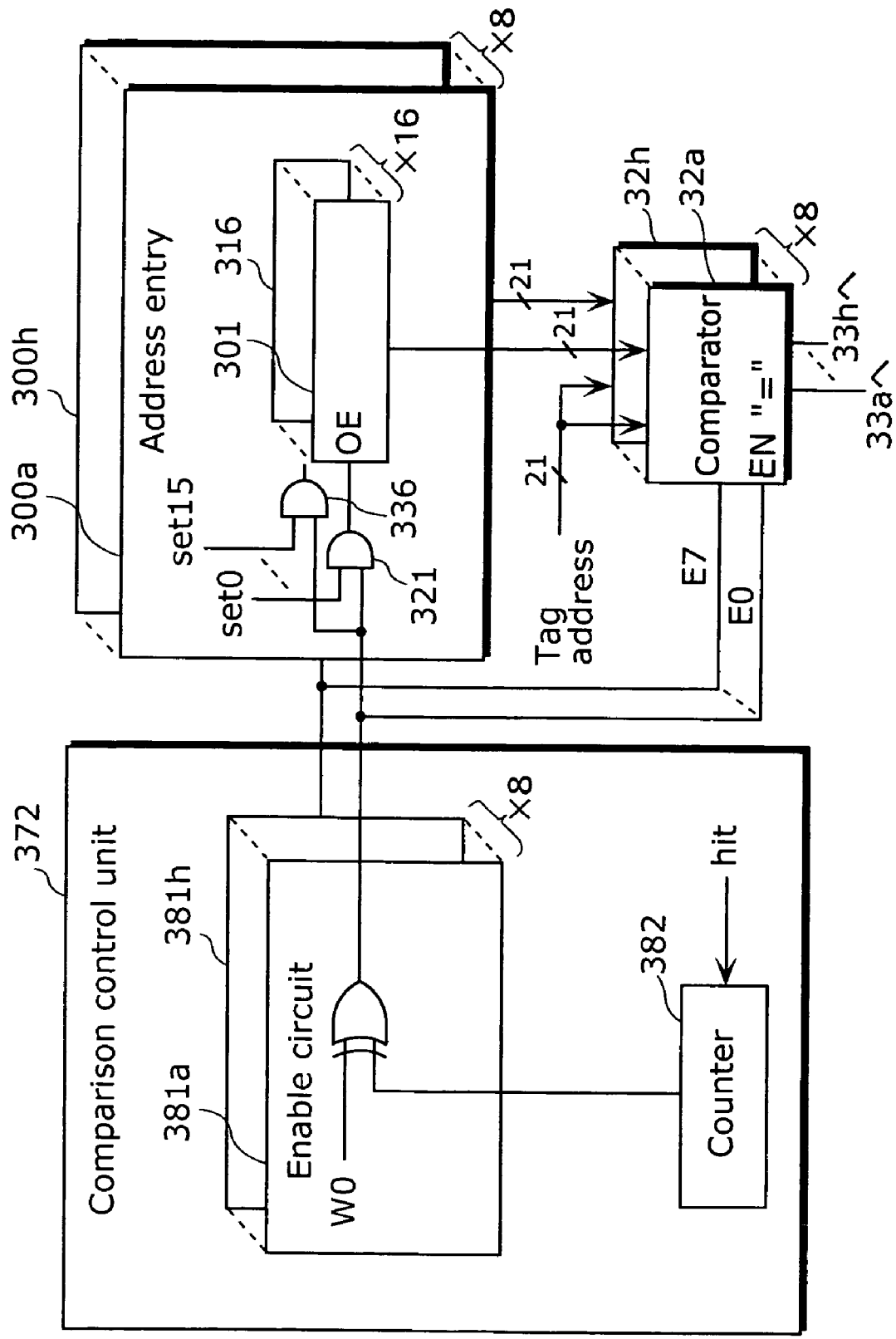
FIG. 19 is a block diagram showing the structure of the relevant parts of the comparison control unit and respective ways in the fourth embodiment of the present invention.

FIG. 19 is a block diagram showing the structure of the relevant parts of the comparison control unit 372 and the ways 231a to 231h.

In the diagram, cache address entries 300a to 300h, respectively included in ways 0 to 8 within the cache memory, each hold the same number of tags as the number of sets (sixteen, in the present embodiment). The cache address entry 300a, included in the way 0, includes sixteen tag holding units 301 to 316 and sixteen AND circuits 321 to 336. The same is true for the rest of the cache address entries 300b to 300h.

The AND circuit 321, corresponding to the set 0 among the sixteen sets, carries out the AND between an enable signal E0 and a selection signal (set 0) for selecting the set 0 through the decoder 30 which decodes the set index. As a result, the AND circuit 321 enables the tag output from the tag holding unit 301, and the comparator 32a, only when the selection signal set 0=1 and the enable signal E0=1.

The comparators 32a to 32h each have an enable terminal EN and, when the input to the enable terminal is 1, a comparison operation is performed on the tag address within the address register 20 and the tag from the cache address entry 301.

The comparison control unit 372 includes eight enable circuits 381a to 381h respectively corresponding to the 8 ways, and a counter 382, and carries out controlling so that tag comparison is performed a maximum of two times in the comparators 32a to 32h. In the first tag comparison, the comparison control unit 372 carries out controlling so that, by enabling a comparator corresponding to an active way and disabling the comparator corresponding to an inactive way, which are indicated in the way register 371, the tag of an active way is made the subject of comparison. In addition, when it is judged that a mishit has occurred in the first tag comparison, the comparison control unit 372 causes the second tag comparison to be carried out so that, by disabling the comparator corresponding to an active way and enabling the comparator corresponding to an active way, the tag of an inactive way is made the subject of the comparison. Furthermore, at the same time as controlling the enabling/disabling of the respective comparators, the comparison control unit 372 also controls the enabling/disabling of tag outputs from the ways 231a to 231h. With this, the power consumption of a disabled comparator and tag output is reduced.

The enable circuits 381a to 381h, corresponding to the ways 231a to 231h respectively, enable, in the first tag comparison, only a comparator, among the comparators 32a to 32h, which corresponds to an active way according to the active way data held in the way register 371 and, in the second tag comparison, enables only a comparator corresponding to an inactive way.

More specifically, the enable circuits 381a to 381h generate enable signals E0 to E7 and, using the enable signals E0 to E7, enable/disable tag outputs from the eight cache address entries corresponding to the ways 0 to 8 within the cache memory, as well as enable/disable the eight comparators 32a to 32h. For example, using an exclusive logical OR circuit, the enable circuit 381a generates the enable signal E0 according to a W0 bit indicating whether or not the way 0 is active, and the count value of the counter 382.

The counter 382 is a counter which counts the number of comparisons, and which counts-up from 0 (first comparison) to 1 (second comparison). However, it does not count-up when a hit occurs on the first comparison.

FIG. 20 shows a truth table indicating the control logic of an enable circuit having the count value of the counter 382 and the active way data Wn (n=0~7) as inputs and an enable signal En as an output. In the diagram, for example, in the case where the ways 0 to 2 are active and the ways 3 to 7 are inactive (W0=1) the enable signals E0 to E2 indicate 1 (enable) and the enable signals E3 to E7 are disabled in the first comparison. When a hit occurs on the first comparison, a second comparison is not carried out as the counter does not count up. When a mishit occurs in the first comparison, the second comparison is carried out as the counter counts up. In this case, in the second comparison, the enable signals E0 to E2 indicate 0 (disable) and the enable signals E3 to E7 indicate 1 (enable).

According to the aforementioned structure, since an inactive way is not made a subject of the comparison in the first tag comparison, it is possible to reduce the power consumption in the comparators and the power consumption for the tag outputs. In addition, since in the case where a mishit occurs in the first tag comparison, the second tag comparison is carried out with only an inactive way being the subject of the comparison, it is possible to effectively utilize the cache data in all of the ways.

Note that in the second comparison, all the comparators may be enabled. In this case, as a second comparison is not carried out when a hit occurs on the first comparison, power consumption can be reduced. In other words, as active ways are assigned on a per task basis, it is considered that a high hit ratio can be obtained in the first comparison.

Furthermore, it is possible to have a structure in which a second comparison is not carried out. As it is considered that a high hit ratio can be obtained in the first comparison, there is the effect of reducing power consumption.

INDUSTRIAL APPLICABILITY

The present invention is suitable as a cache memory and a control method thereof, for facilitating high-speed memory access from a processor, and is suitable, for example, as an on-chip cache memory, an off-chip cache memory, a data cache memory, an instruction cache memory, and the like.

The invention claimed is:

1. An N-way set-associative cache memory, comprising:
   a control register operable to indicate one or more ways among N ways;
   a control unit operable to activate the way indicated by said control register; and
   an updating unit operable to update contents of said control register,
   wherein the control register is configured to dynamically set the activated way based on a process executed by a processor, and
   wherein the control register prevents data from being evicted from the cache memory by other tasks after task switching, and inhibits influence of the other tasks on a hit ratio following the task switching.

2. The cache memory according to claim 1,
   wherein said control unit is operable to restrict at least replacement, for a way other than the active way indicated by said control register.

3. The cache memory according to claim 1, further comprising:
   a tag holding unit, provided for each of the ways, operable to hold, as a tag, a cache data address; and
   N-comparison units operable to judge whether a hit or a mishit has occurred, by comparing a tag address and N-tags outputted by said tag holding unit, the tag address being an upper portion of a memory access address outputted from a processor,
   wherein said control unit is operable to disable a comparison unit corresponding to a way other than the active way indicated by said control register.

4. The cache memory according to claim 3,
   wherein said control unit is operable to disable tag outputting to a comparison unit, for a cache address holding unit corresponding to the way other than the active way indicated by said control register.

5. The cache memory according to claim 3,
   wherein, when a memory access address is outputted from the processor, said control unit is operable to:
   control said comparison units to perform, for a maximum of two times, tag comparison for the memory access address;
   disable, in a first tag comparison, a comparison unit corresponding to the way other than the active way indicated by said control register; and
   cause said comparison units to perform a second comparison, without disabling the comparison unit corresponding to the way other than the active way, in the case where it is judged that a mishit has occurred in the first tag comparison.

6. The cache memory according to claim 5,
   wherein said control unit is operable to disable, in the second tag comparison, the comparison unit corresponding to the way other than the active way.

7. The cache memory according to claim 2,
   wherein said control unit is operable to prohibit status updating for the way other than the active way indicated by said control register.

8. The cache memory according to claim 2,
   wherein said control unit is operable to prohibit updating of information indicating an access order of the way other than the active way indicated by said control register.

9. The cache memory according to claim 2, further comprising
   a reset unit operable to reset the information indicating an access order for the ways, when the contents of said control register are updated by said updating unit.

10. The cache memory according to claim 9,
    wherein the information indicating the access order is 1-bit data for each cache entry, said cache memory further comprises
    a register operable to hold data indicating a round position for selecting, in a round robin, one way from a plurality of replaceable ways, and
    said reset unit is operable to reset said register when the contents of said control register are updated by said updating unit.

11. The cache memory according to claim 2,
    wherein said updating unit includes:
    a holding unit operable to hold way data for respective tasks, which specifies a way to be activated; and
    a rewriting unit operable to rewrite said control register so as to hold way data corresponding to a task being executed.

12. The cache memory according to claim 11,
    wherein said holding unit is operable to hold the way data as part of context data for the respective tasks which is stored in a memory, and
    during task switching, said rewriting unit is operable to save, in the memory, way data of a current task, inside said register, and to restore, from the memory to said control register, way data of a next task.

13. The cache memory according to claim 12,
    wherein said holding unit is operable to hold the way data for the respective tasks, and
    said rewriting unit includes:
    an address storage unit operable to store an address range of the respective tasks, stored in the memory;
    an identification unit operable to identify the task being executed, based on the address range stored in the address storage unit and an instruction fetch address outputted from a processor; and
    a selection unit operable to select, from said holding unit, way data corresponding to the identified task being executed.

14. The cache memory according to claim 12,
    wherein said holding unit is operable to hold the way data for the respective tasks,
    said rewriting unit includes:
    a selection unit operable to select way data from said holding, according to a task number outputted from a processor unit, the way data corresponding to a task being executed; and
    a writing unit operable to write the selected way data into said control register.

15. The cache memory according to claim 11,
    wherein way data held in said holding unit is assigned to a task, by an operating system.

16. The cache memory according to claim 1,
    wherein a unit of replacement for respective ways can be switched between a line size of a cache entry and a size which is one over two to the nth power of the line size,
    said control register is further operable to indicate a replacement size for respective tasks, and
    said control unit is operable to perform replacement control with the replacement size indicated by said control unit.

17. The cache memory according to claim 16,
wherein said control unit is operable to restrict at least replacement for a way other than the active way indicated by said control register, and to perform replacement on the active way indicated by said register, with the size indicated by said control register.

18. The cache memory according to claim 17,
wherein said updating unit includes:
a holding unit operable to hold way data for respective tasks, specifying a way to be activated, and the replacement size for the respective tasks; and
a rewriting unit operable to rewrite said control register so as to hold way data and a replacement size corresponding to a task being executed.

19. The cache memory according to claim 1, further comprising:
a storage unit operable to store, for each cache entry, 1-bit access information indicating whether or not the cache entry has been accessed, the cache entry holding data which is a unit of caching; and
a selection unit operable to select a cache entry to be replaced from among cache entries corresponding to access information indicating that a cache entry has not been accessed.

20. The cache memory according to claim 19, further comprising:
a register operable to hold data indicating a round position for selecting, in a round robin, one way from a plurality of ways that can be replaced; and
a reset unit operable to reset, when the contents of said control register are updated by said updating unit, information indicating an access order for ways, and the data, in said register, indicating the round position.

21. A control method for controlling an N-way set-associative cache memory, comprising:
setting, to a control register, way data indicating one or more ways among N ways; and
activating the way indicated by the control register,
wherein the control register is configured to dynamically set the activated way based on a process being executed by a processor; and
wherein the control register prevents data from being evicted from the cache memory by other tasks after task switching, and inhibits influence of the other tasks on hit ratio following task switching.

22. The control method according to claim 21,
wherein in said controlling, at least replacement is restricted for a way other than the active way indicated by the control register.

23. The control method according to claim 22, further comprising an updating step of reading-out, from a holding unit, way data corresponding to a task being executed, and writing the read-out way data into the control register, the holding unit holding way data for respective tasks, the way data specifying a way to be activated.

* * * * *